United States Patent [19]
Hyslop

[11] Patent Number: 5,394,183
[45] Date of Patent: Feb. 28, 1995

[54] METHOD AND APPARATUS FOR ENTERING COORDINATES INTO A COMPUTER

[75] Inventor: David M. Hyslop, Spartanburg, S.C.

[73] Assignee: Milliken Research Corporation, Spartanburg, S.C.

[21] Appl. No.: 878,565

[22] Filed: May 5, 1992

[51] Int. Cl.⁶ .............................................. H04N 7/18
[52] U.S. Cl. ..................... 348/88; 348/92; 348/141; 345/157
[58] Field of Search ................. 340/707; 358/93, 106, 358/107; 348/94, 92, 88, 86, 61, 141, 131, 130, 129, 128, 125; H04N 7/18; 345/157

[56] References Cited

U.S. PATENT DOCUMENTS

| | | | |
|---|---|---|---|
| 4,349,838 | 9/1982 | Daniel | 358/125 |
| 4,488,173 | 12/1984 | Di Matteo | 358/107 |
| 4,583,181 | 4/1986 | Gerber | 358/106 |
| 4,591,841 | 5/1986 | Gunderson | 340/707 |
| 4,671,654 | 6/1987 | Miyahara et al. | 356/152 |
| 4,758,960 | 7/1988 | Jung | 358/106 |
| 4,805,019 | 2/1989 | Holliday | 358/107 |
| 4,845,556 | 7/1989 | Somers et al. | 358/101 |
| 4,853,776 | 8/1989 | Itaya | 358/106 |
| 4,853,777 | 8/1989 | Hupp | 358/107 |
| 4,873,398 | 10/1989 | Hubby, Jr. | 340/706 |
| 4,893,922 | 1/1990 | Eichweber | 356/1 |
| 4,914,460 | 4/1990 | Caimi et al. | 354/64 |
| 4,974,077 | 11/1990 | Kusaba | 358/107 |
| 5,091,963 | 2/1992 | Litt et al. | 348/86 |
| 5,115,230 | 5/1992 | Smoot | 340/707 |
| 5,138,304 | 8/1992 | Bronson | 358/93 |

FOREIGN PATENT DOCUMENTS

| | | | |
|---|---|---|---|
| 217205 | 9/1988 | Japan | G01B 11/00 |
| 0217214 | 9/1988 | Japan | 358/107 |
| 217214 | 9/1988 | Japan . | |

Primary Examiner—Jeffery Brier
Assistant Examiner—Bryan S. Tung
Attorney, Agent, or Firm—Kevin M. Kercher; Terry T. Moyer

[57] ABSTRACT

A method and apparatus to input two dimensional points in space into a computer. Such points in space reside within the field of view of a video camera, which is suitably connected to a computer. The operator aims a focus of light at the point whose coordinates are desired and depresses a trigger button mounted proximate to the light source. The trigger actuation signals the computer to capture a frame of video information representing the field of view of the camera, and with appropriate software, identifies the picture element within that frame that has the brightest value by comparison with the field of view without the focus of light. This picture element will be the one associated with the point within the field of view upon which the spot of light impinged at the time the trigger button was depressed. The actual digital coordinates of the point are identified and then calculated based upon a previously established relationship between the video frame and the camera field of view.

16 Claims, 16 Drawing Sheets

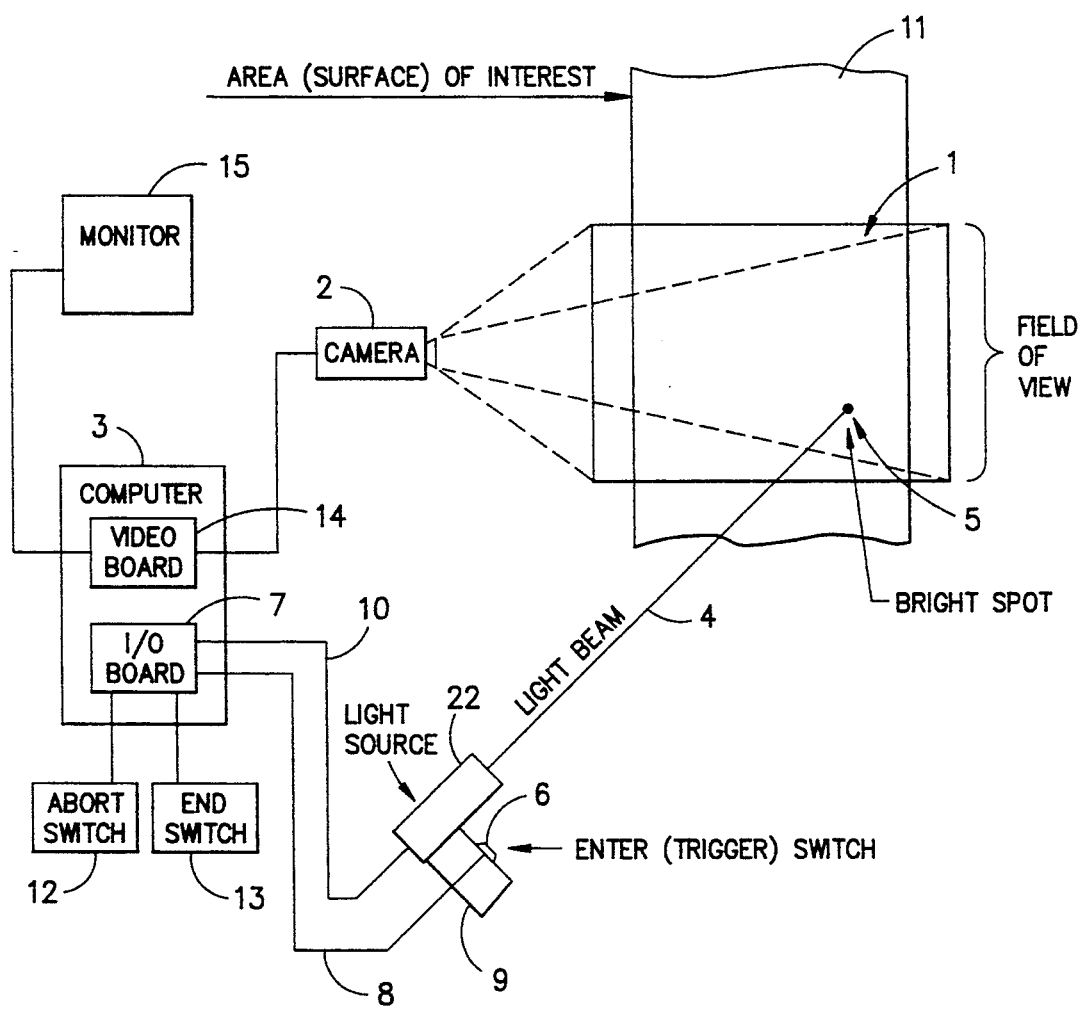
FIG. —1—

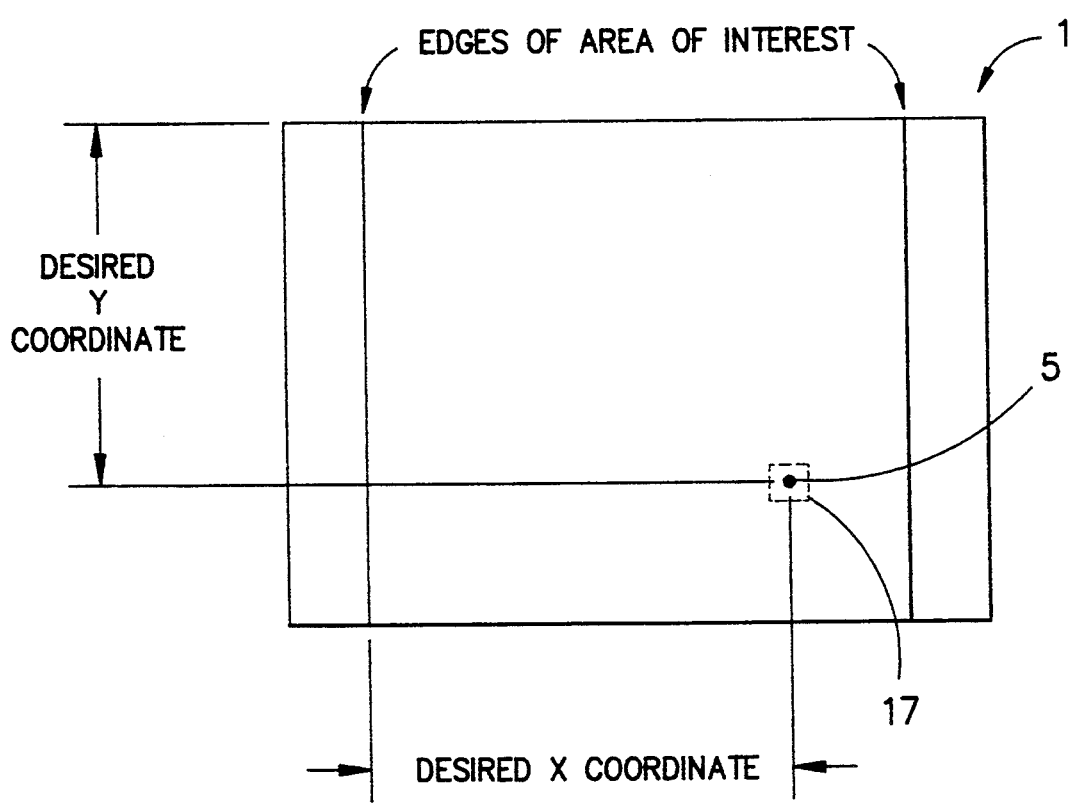
FIG. -2-

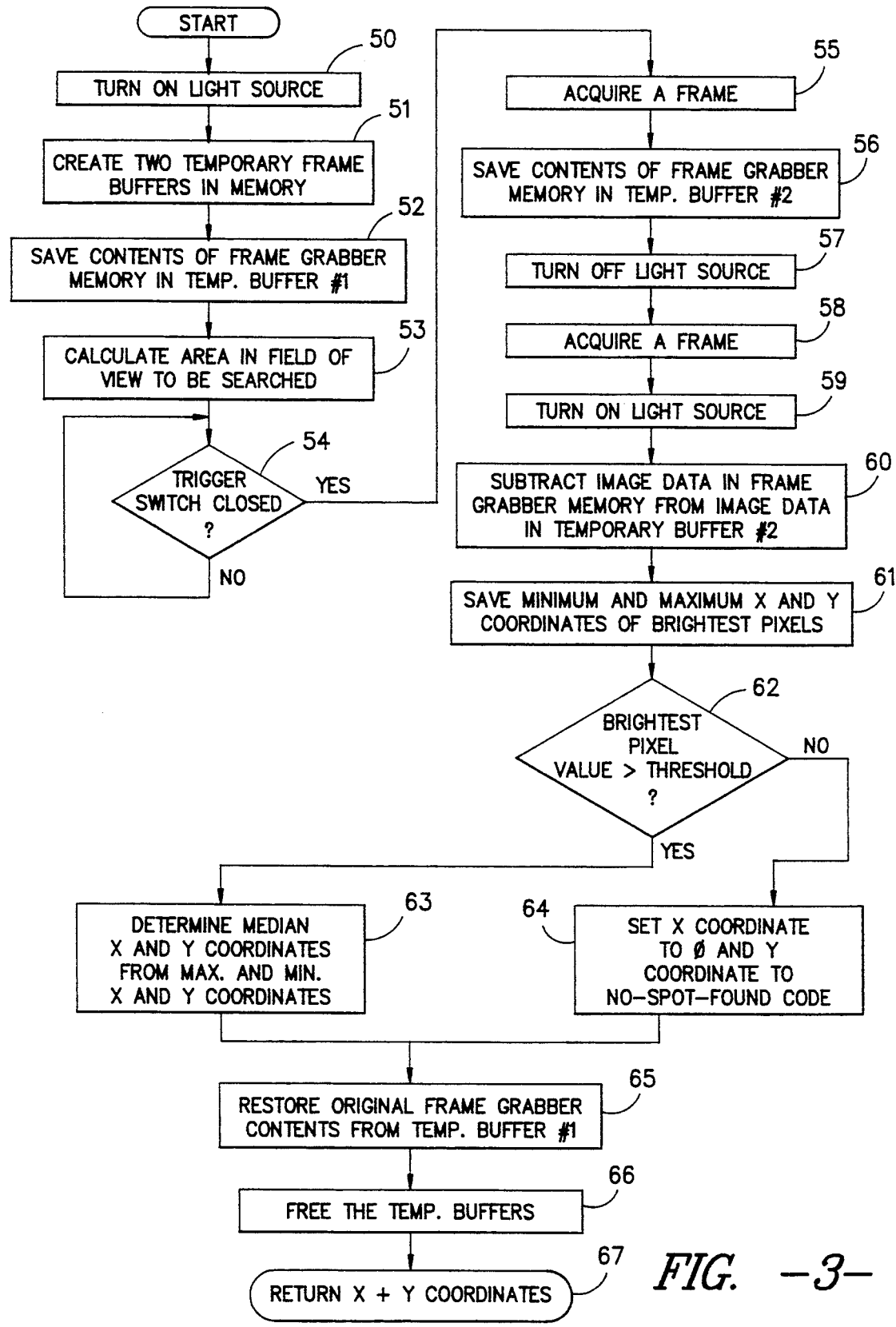
FIG. -3-

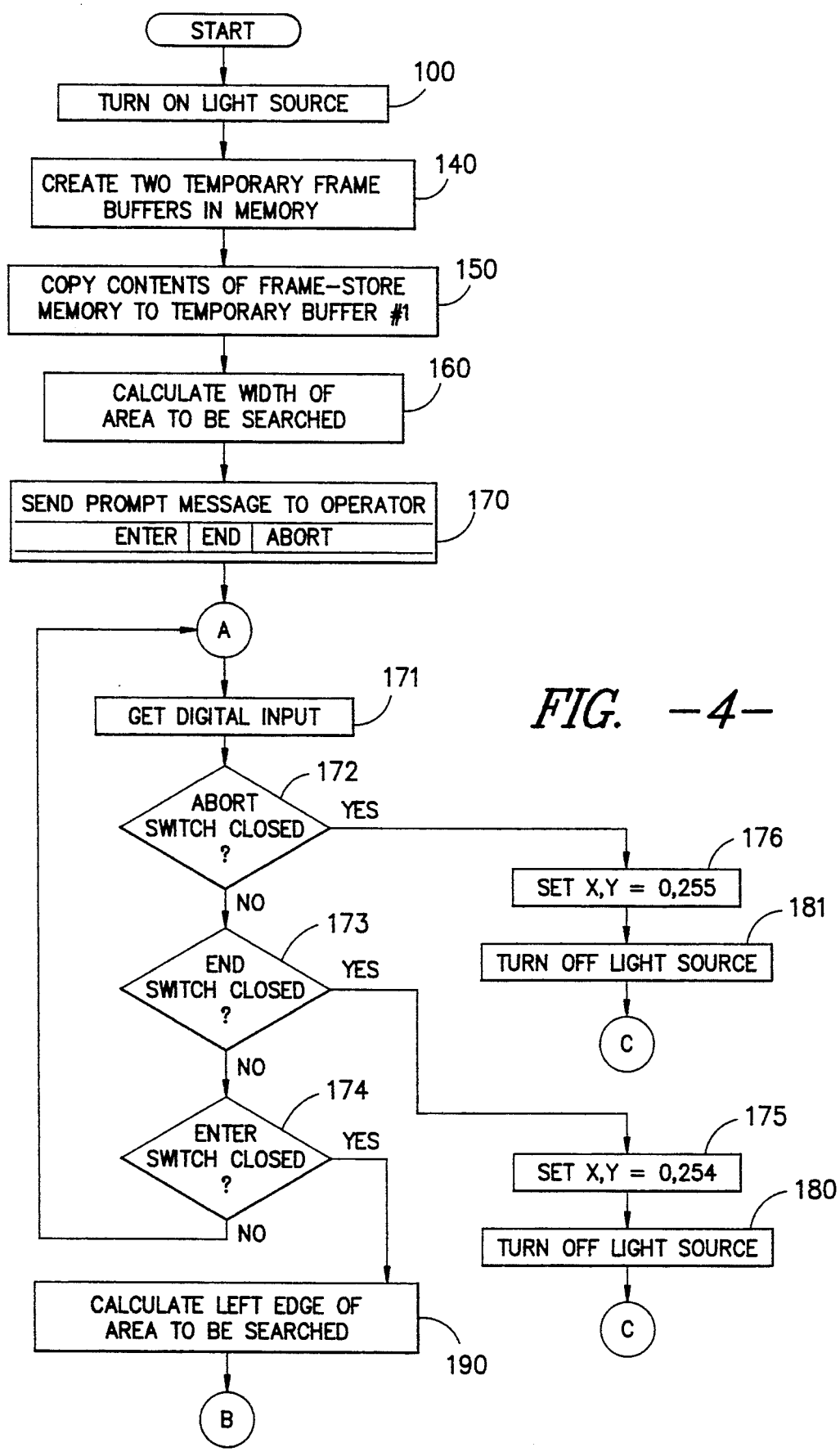
FIG. —4—

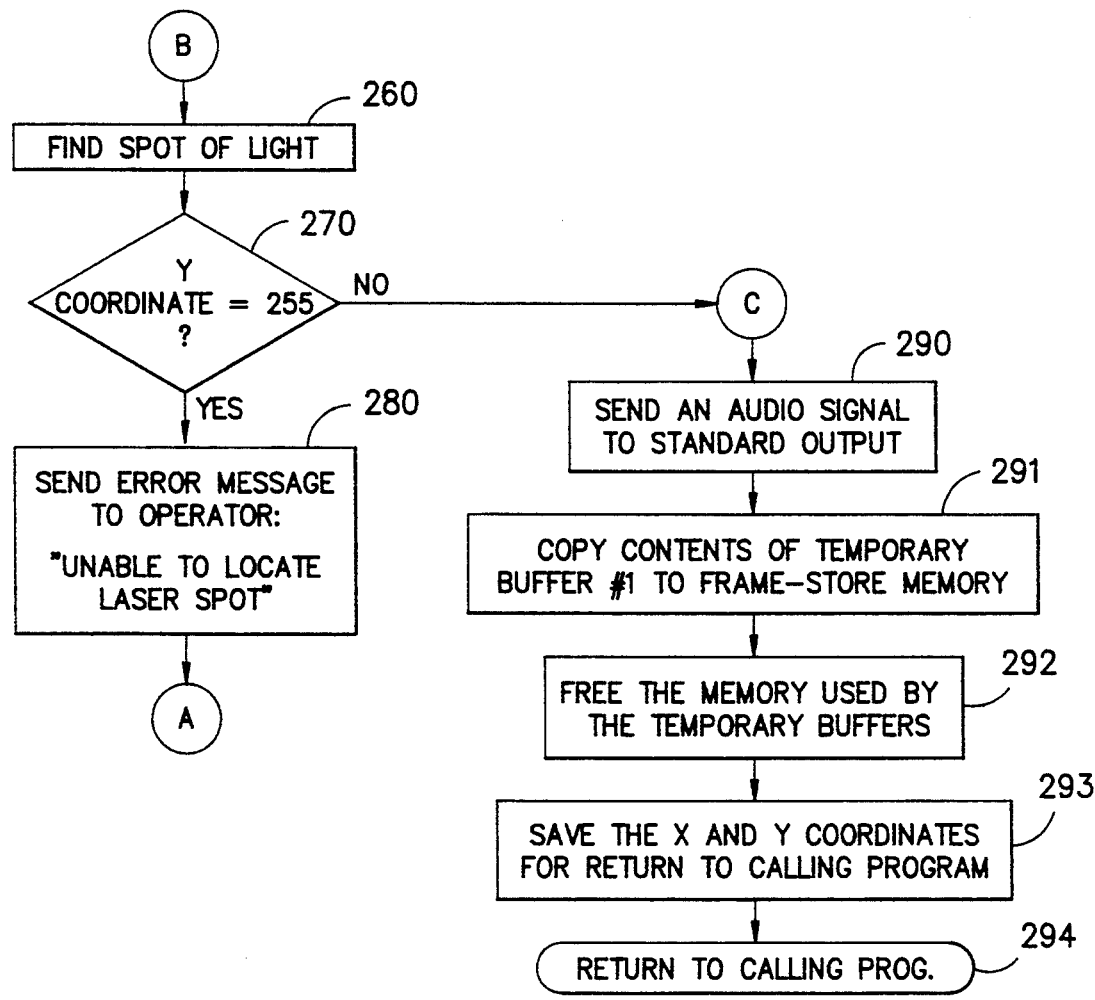
FIG. —4A—

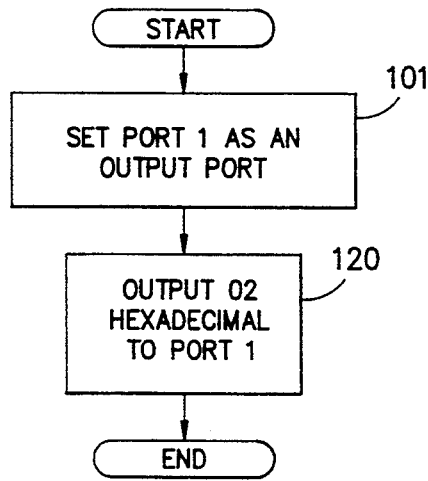
FIG. -5-
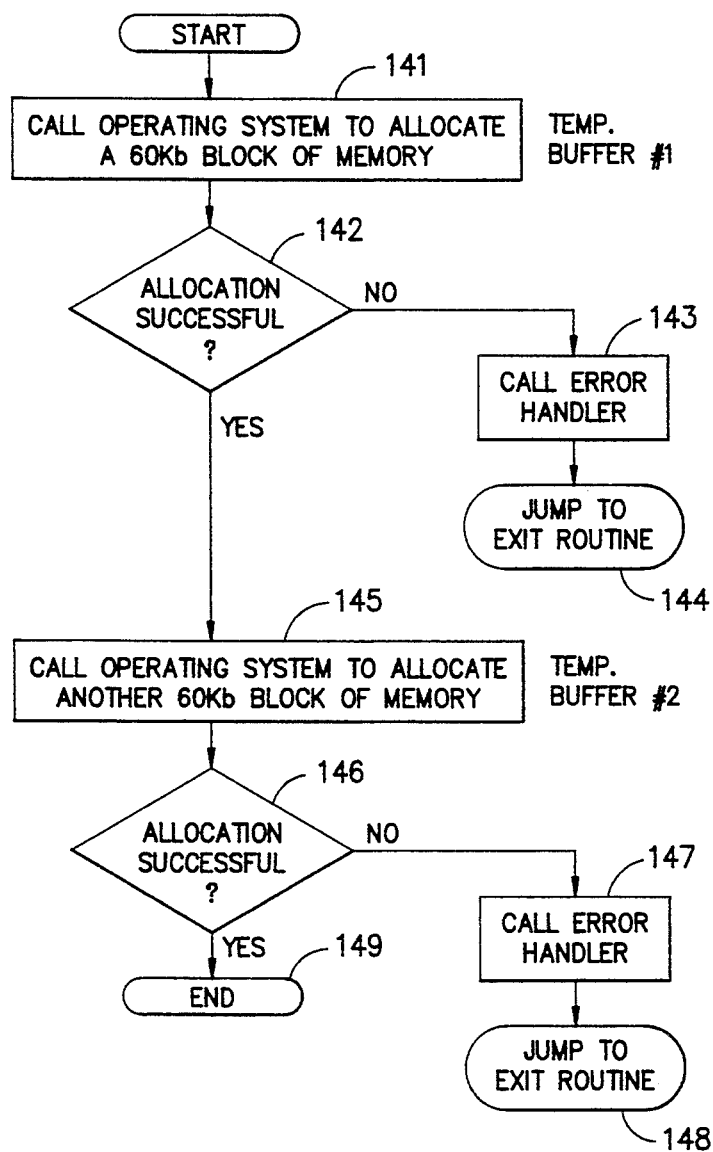
FIG. -6-

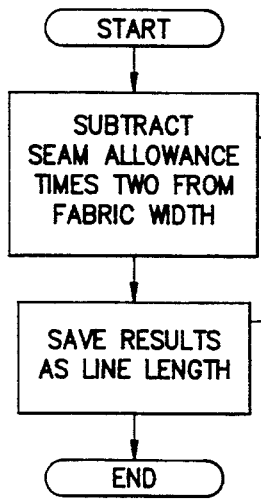
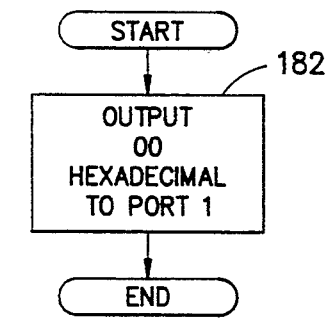
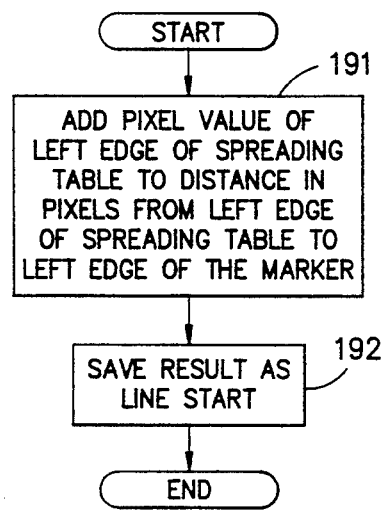
FIG. -7-
FIG. -8-
FIG. -9-
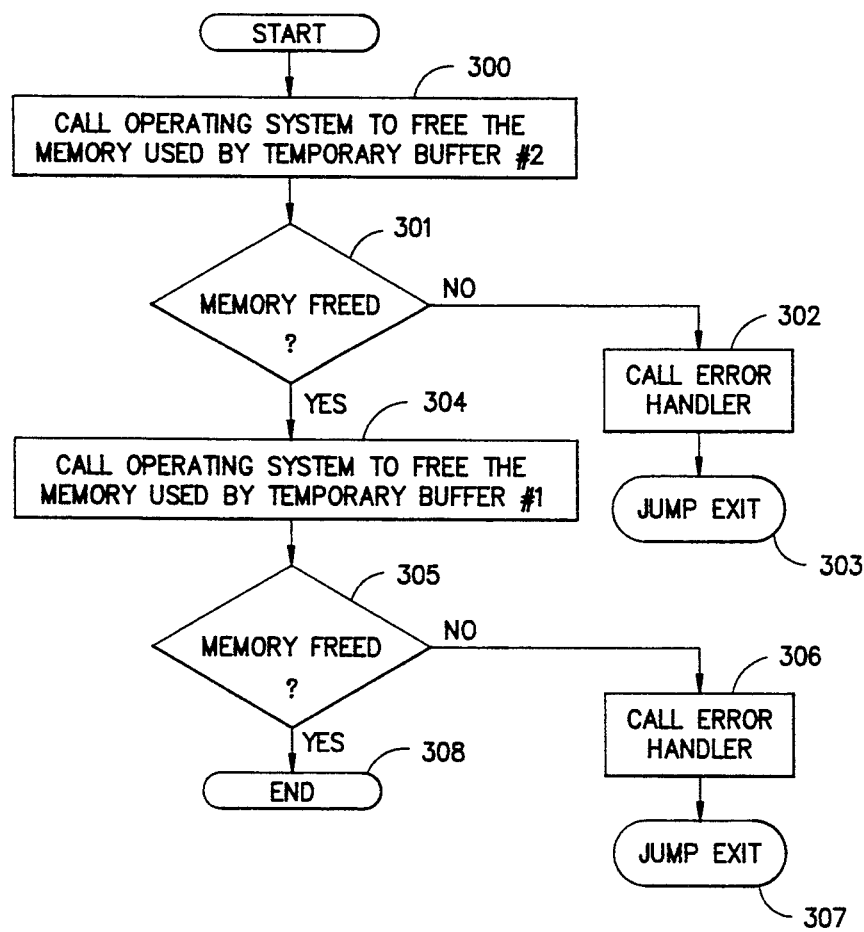
FIG. -10-

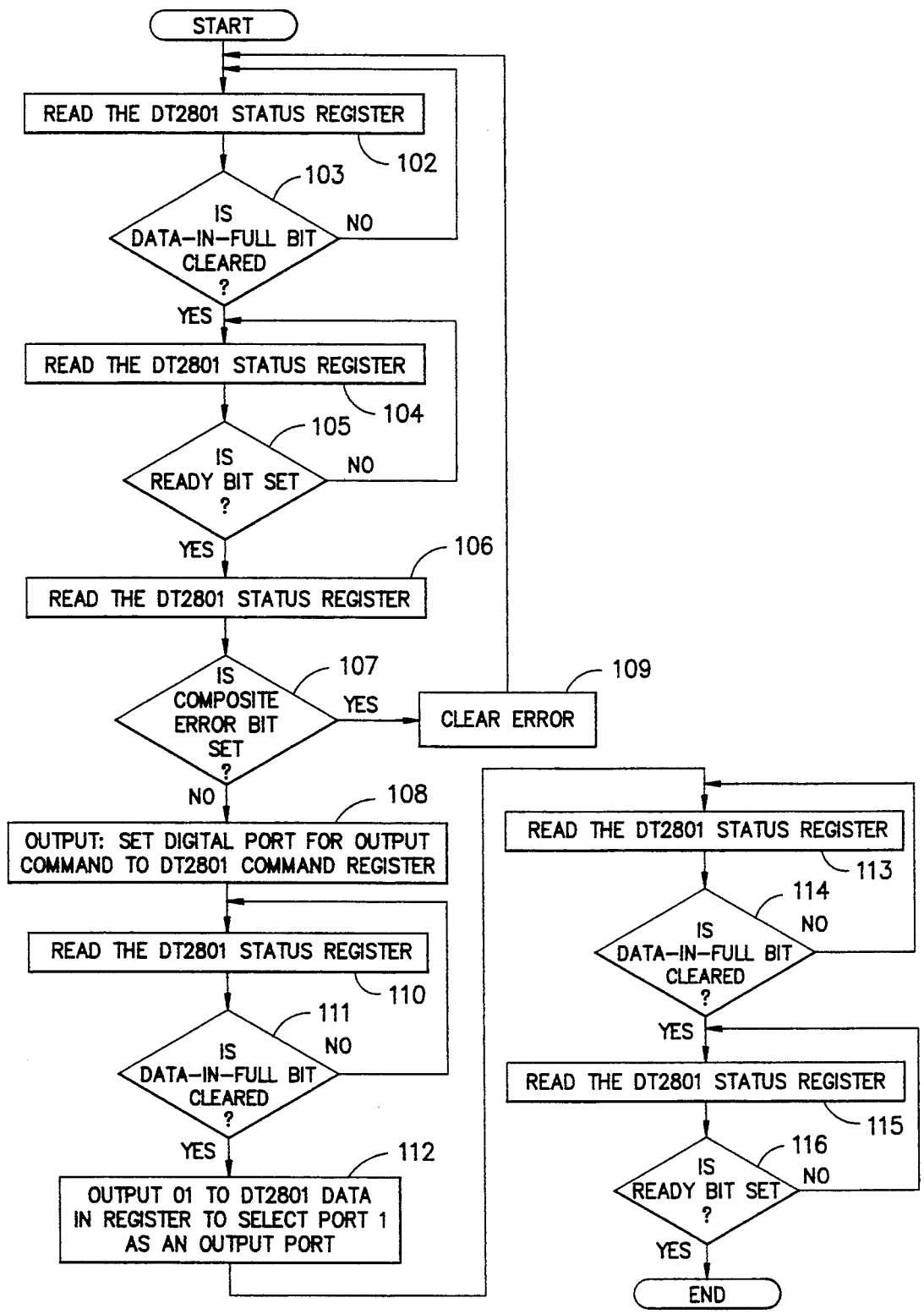
FIG. —11—

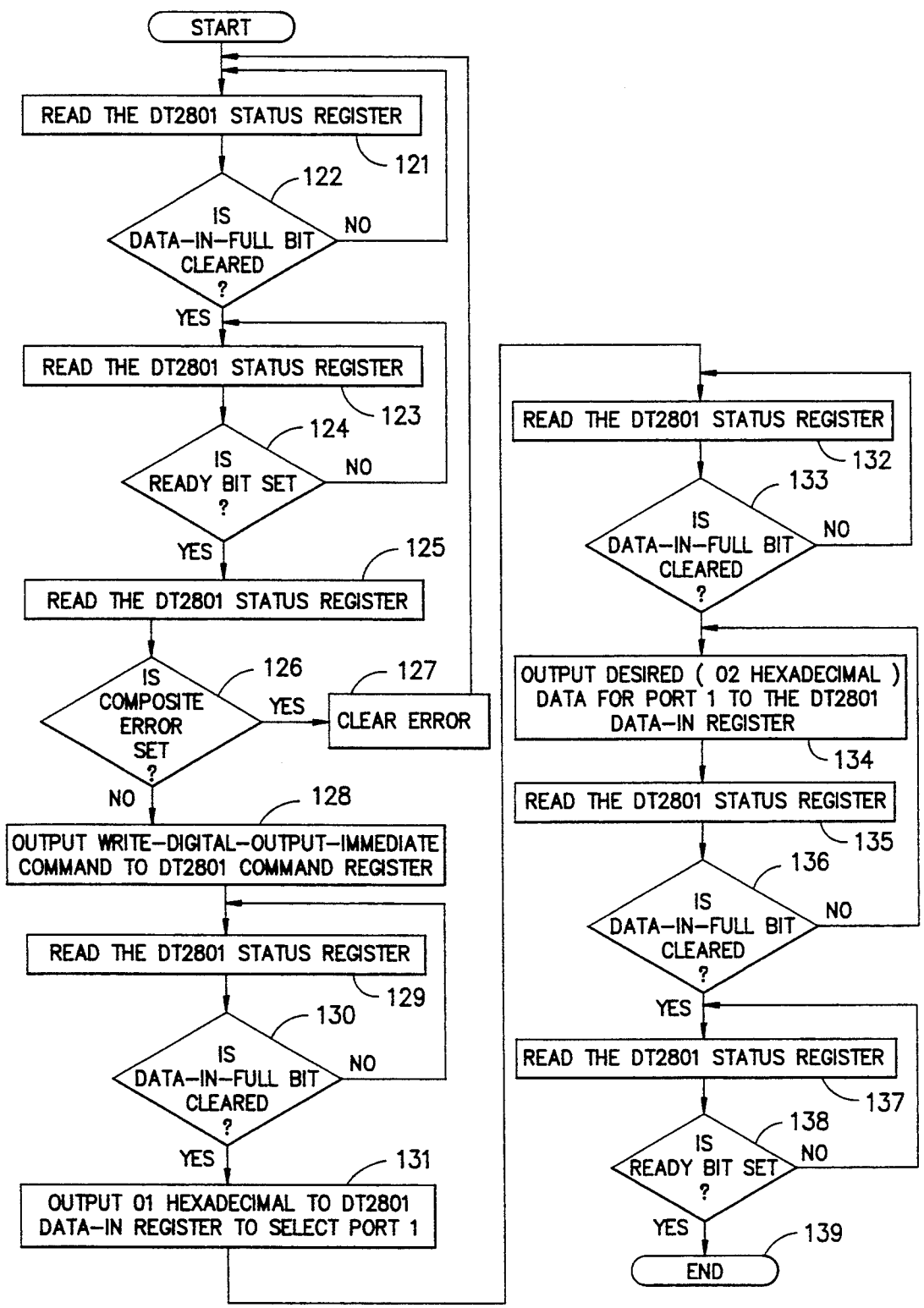
FIG. -12-

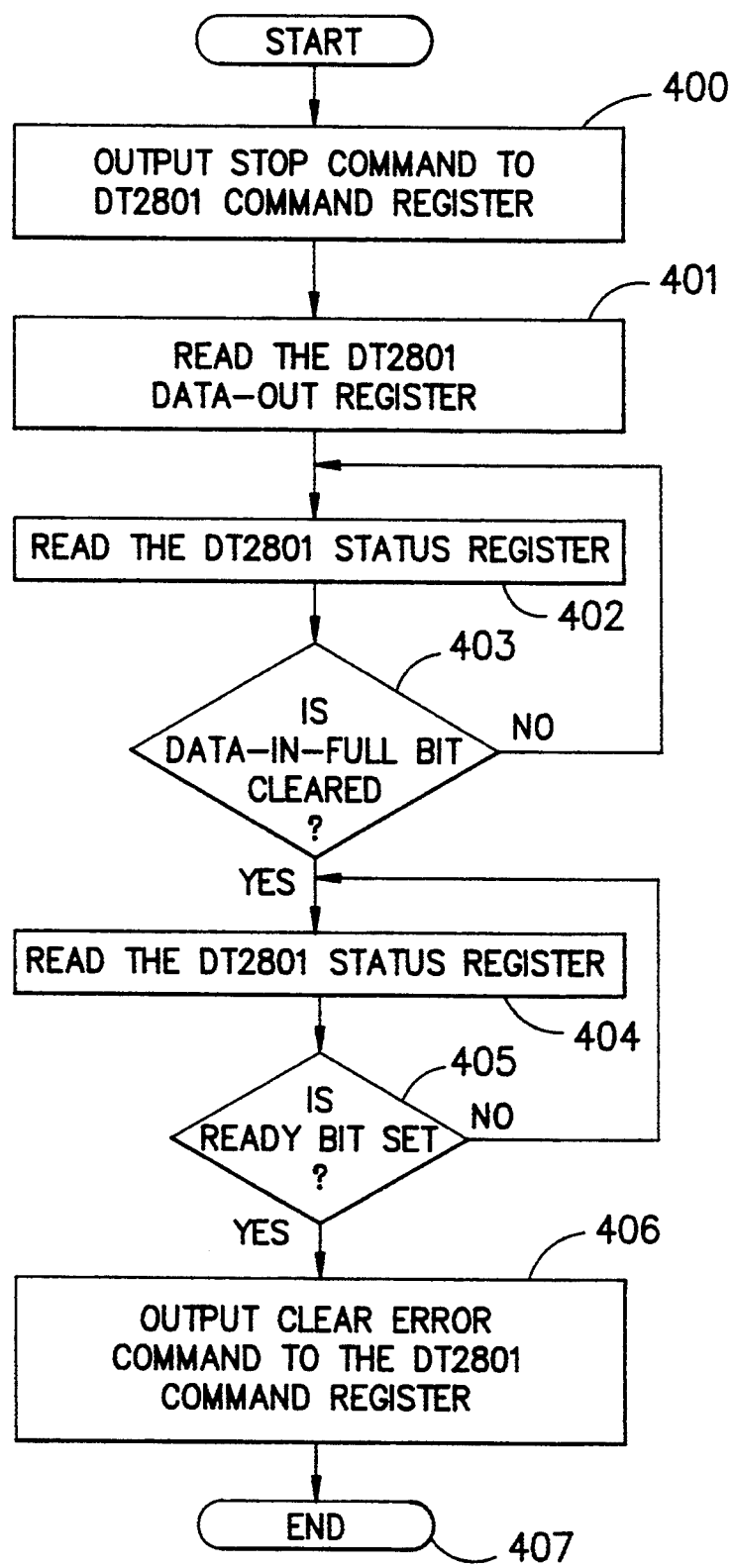
FIG. -13-

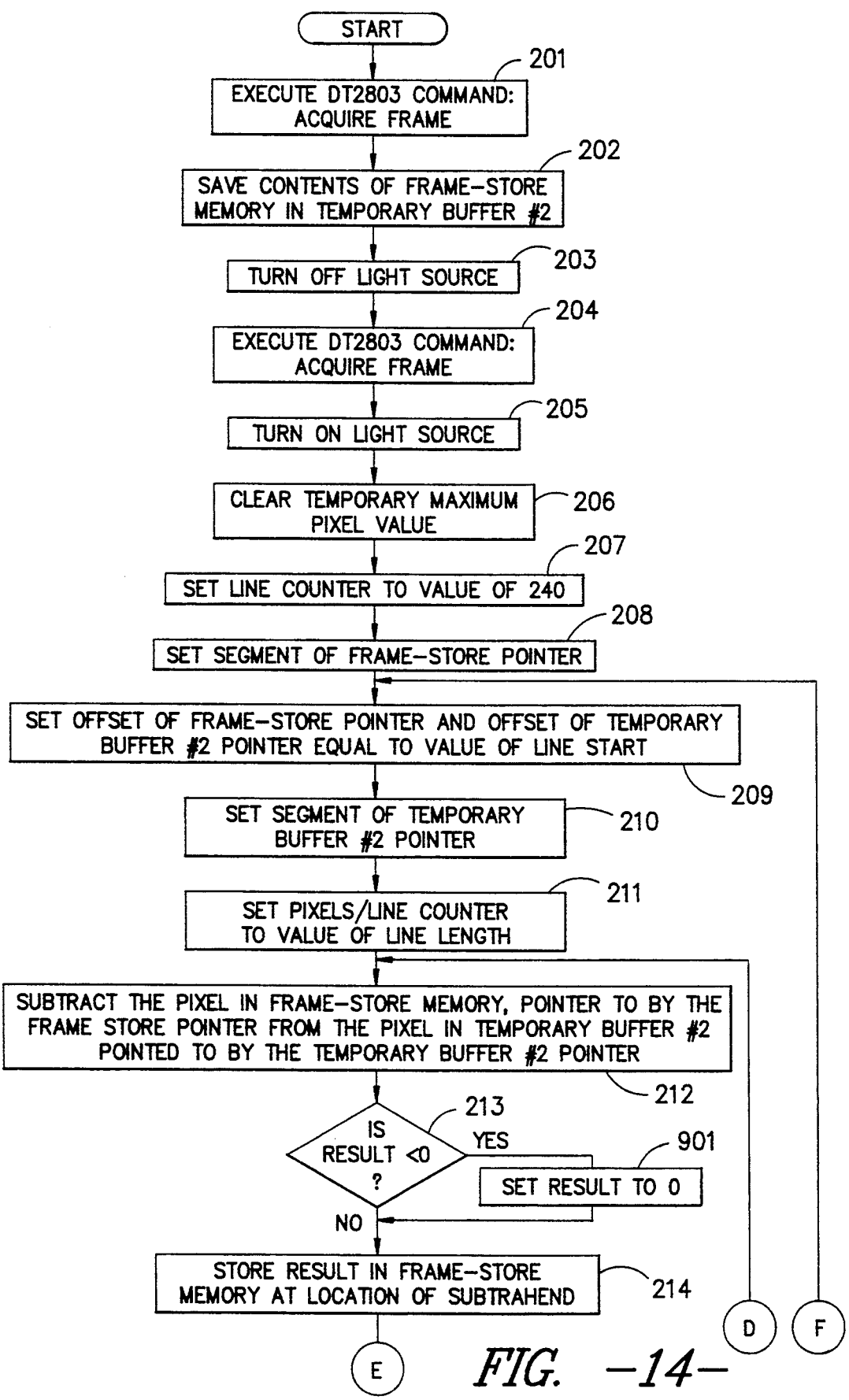
FIG. —14—

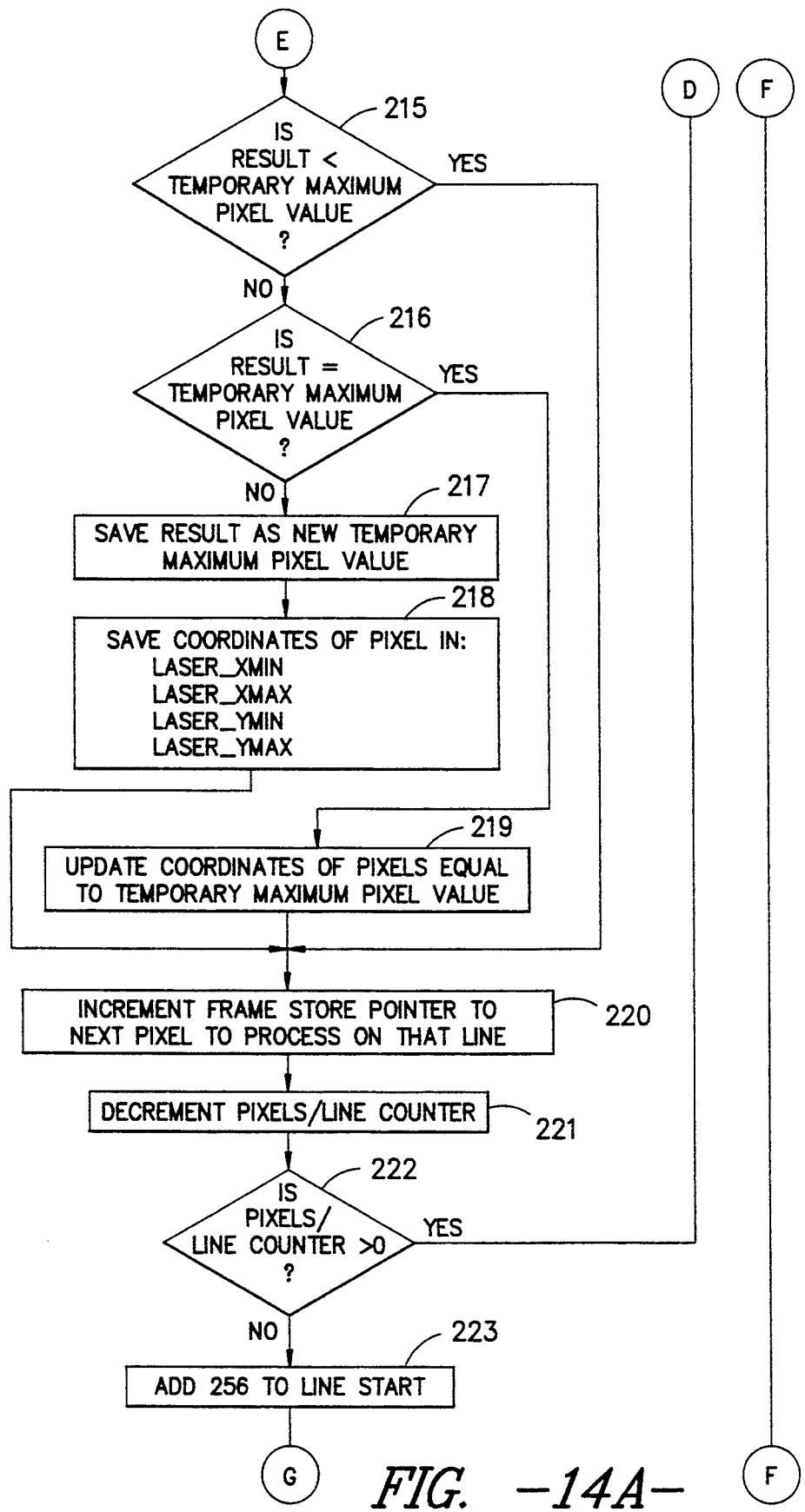
FIG. —14A—

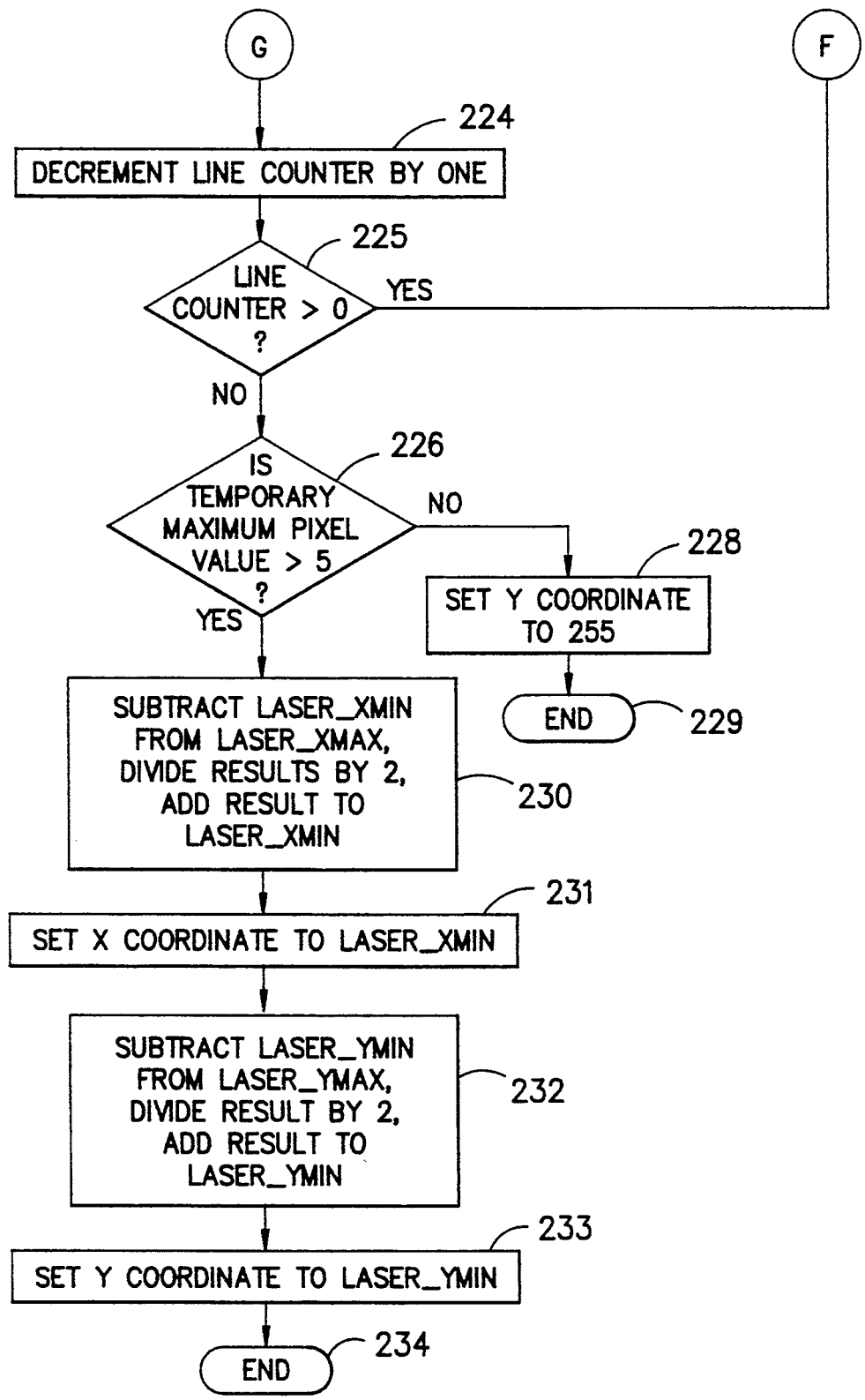
FIG. —14B—

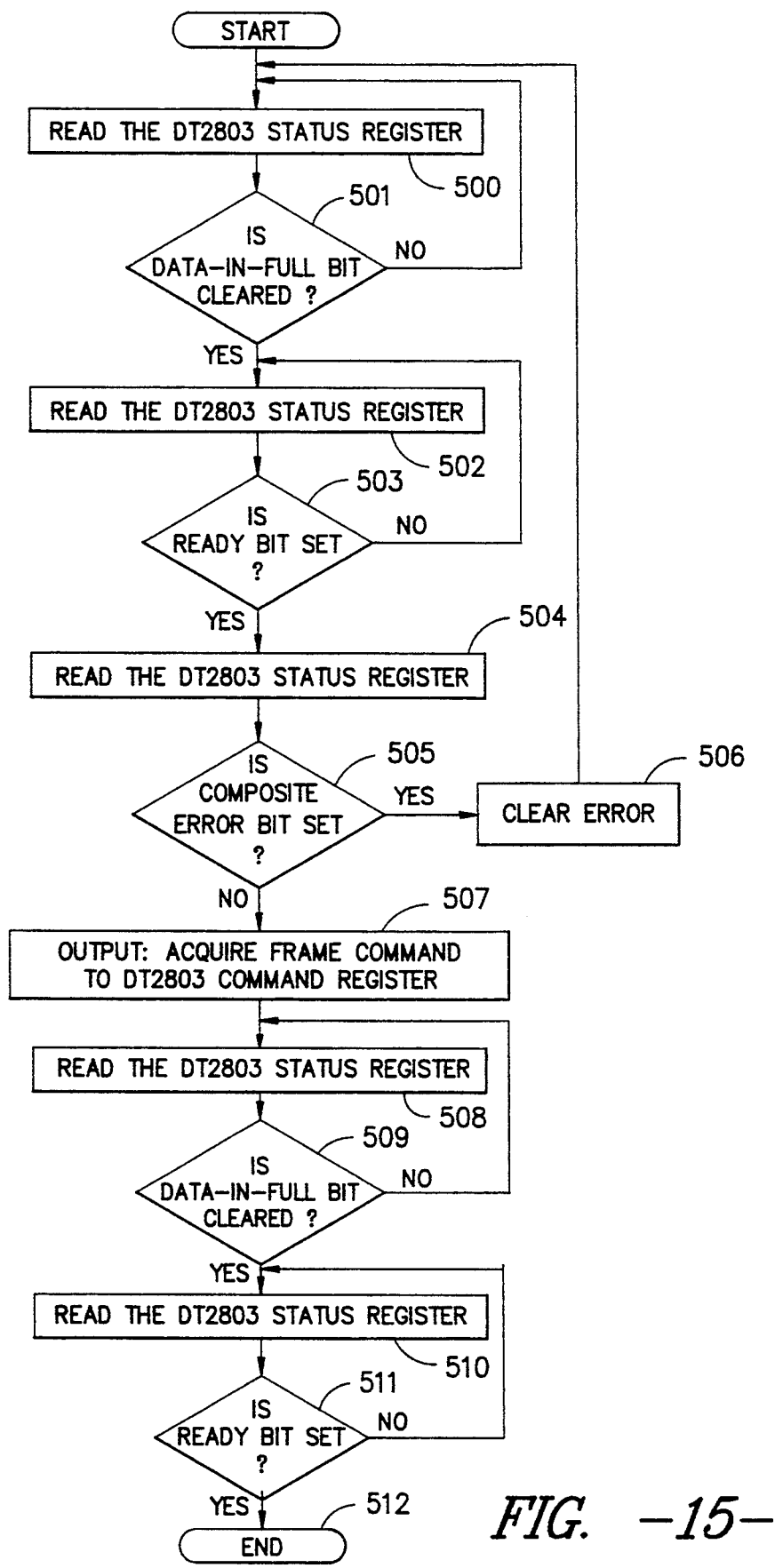
FIG. -15-

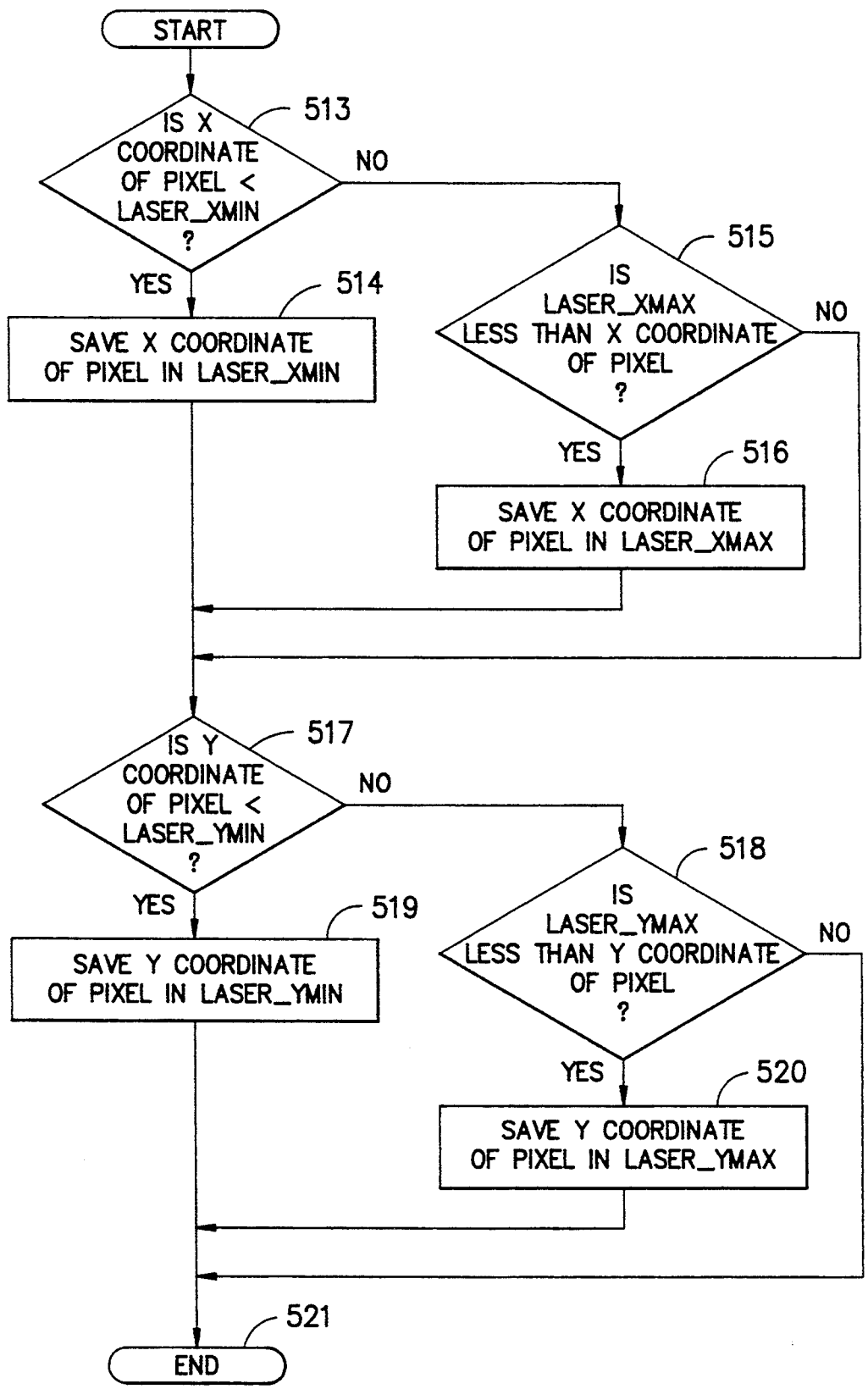
FIG. -16-

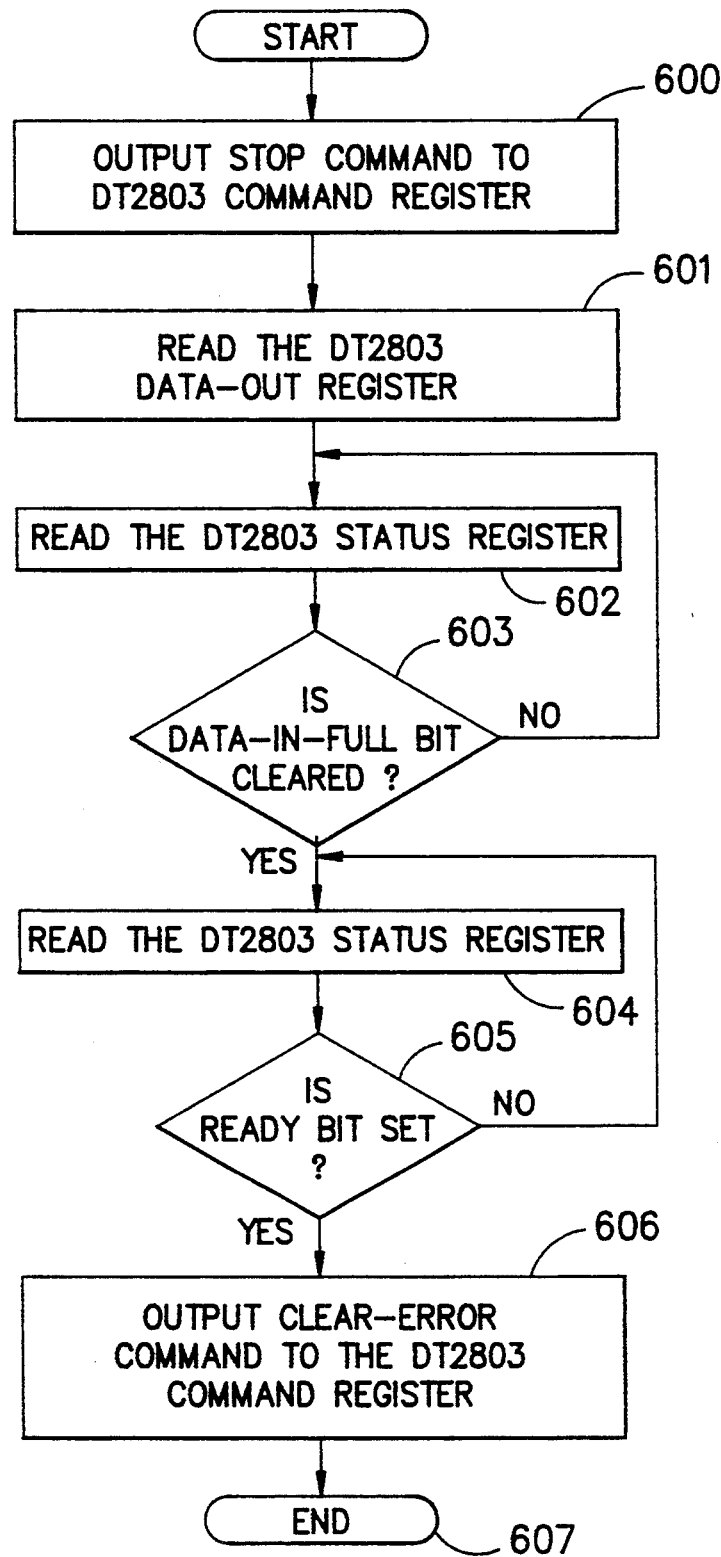
FIG. −17−

METHOD AND APPARATUS FOR ENTERING COORDINATES INTO A COMPUTER

BACKGROUND OF THE INVENTION

This invention relates to an improved method and apparatus for entering coordinates into a computer. The accurate location of two dimensional data and importing that information into a computer is a very time consuming operation. One of the advantages of loading two dimensional data into a computer would be for the location of defects in relatively flat material that requires further processing. If the defects can be identified with relation to some fixed reference point and converted into x-y coordinates, then these coordinates can be compared to a map of components developed from the material. Then the computer could determine which components are affected by the defect and would inform the operator how to handle the problem optimally to create the least amount of waste product. A non-limiting example of this concept would be material being a substrate such as a textile fabric with the associated defects being stop marks, holes, grease stains, and so forth. Currently, an operator places the fabric on a spreader table that lays down multiple layers from which parts will be cut in later operations from the stack. The operator must measure the coordinates with a ruler and type them into the computer via a keyboard. This is a very time consuming and thereby expensive process. Furthermore, it is also very monotonous and tedious, which lends itself to inaccuracies.

The present invention solves the above problems in a manner not disclosed in the known prior art.

SUMMARY OF THE INVENTION

A method and apparatus to input two dimensional points in space into a computer. Such points in space reside within the field of view of a video camera, which is suitably connected to a computer. The operator aims a focus of light at the point whose coordinates are desired and depresses a trigger button mounted proximate to the light source. The trigger actuation signals the computer to capture a frame of video information representing the field of view of the camera, and with appropriate software, identifies the picture element within that frame that has the brightest value. This picture element will be the one associated with the point within the field of view upon which the spot of light impinged at the time the trigger button was depressed. The actual digital coordinates of the point are identified and then calculated based upon a previously established relationship between the video frame and the camera field of view.

It is an advantage of this invention to enter coordinates into a computer without any manual measurement.

It is another advantage of this invention to enter coordinates into a computer by merely aiming a point of light at an appropriate location.

Yet another advantage of this invention to enter coordinates into a computer Without typing on a keyboard thereby eliminating the inaccuracies and extensive time associated therewith.

Still another advantage of this invention is the rapid speed in which coordinates may be entered into a computer.

These and other advantages will be in part obvious and in part pointed out below.

BRIEF DESCRIPTION OF THE DRAWINGS

The above as well as other objects of the invention will become more apparent from the following detailed description of the preferred embodiment of the invention, which when taken together with the accompanying drawings, in which:

FIG. 1 is a diagrammatic representation, showing the role of various components utilized in entering coordinates into a computer of the present invention;

FIG. 2 is an enlarged explanatory diagram of the field of view located in FIG. 1;

FIG. 3 is a basic flow chart of the coordinate importation through light recognition process of the present invention;

FIG. 4 is a detailed flow chart of the main program for coordinate importation through light recognition program of the present invention;

FIG. 4A is a continuation of the detailed flow chart of FIG. 4 of the main program for coordinate importation through light recognition program of the present invention;

FIG. 5 is a detailed flow chart of a subroutine to turn on a light source, which is a step in the main program for coordinate importation through light recognition program of the present invention as shown in FIGS. 4 and 4A as well as a step in a subroutine to find a spot of light in FIGS. 14, 14A and 14B;

FIG. 6 is a detailed flow chart of a subroutine to create two temporary frame buffers in memory, which is a step in the main program for coordinate importation through light recognition program of the present invention as shown in FIGS. 4 and 4A;

FIG. 7 is a detailed flow chart of a subroutine to calculate the width of the area to be searched, which is a step in the main program for coordinate importation through light recognition program of the present invention as shown in FIGS. 4 and 4A;

FIG. 8 is a detailed flow chart of a subroutine to turn off the light source, which is a step in the main program for coordinate importation through light recognition program of the present invention as shown in FIGS. 4 and 4A as well as a step in a subroutine to find a spot of light in FIGS. 14, 14A and 14B;

FIG. 9 is a detailed flow chart of a subroutine to calculate the left edge of the area to be searched, which is a step in the main program for coordinate importation through light recognition program of the present invention as shown in FIGS. 4 and 4A;

FIG. 10 is a detailed flow chart of a subroutine to free the memory used by the two temporary buffers created by the subroutine of FIG. 6, which is a step in the main program for coordinate importation through light recognition program of the present invention as shown in FIGS. 4 and 4A;

FIG. 11 is a detailed flow chart of a subroutine to set port 1 as an output port, which is a step in the subroutine to turn on a light source as shown in FIG. 5;

FIG. 12 is a detailed flow chart of a subroutine to output 02 hexadecimal to port 1, which is a step in the subroutine to turn on a light source as shown in FIG. 5;

FIG. 13 is a detailed flow chart of a subroutine to clear error, which is a step in the subroutine to set port 1 as an output port as shown in FIG. 11 and is a step in the subroutine to output 02 hexadecimal to port 1 as shown in FIG. 12;

FIG. 14 is a detailed flow chart of a subroutine to find a spot of light, which is a step in the main program for coordinate importation through light recognition program of the present invention as shown in FIGS. 4 and 4A;

FIG. 14A is a continuation of detailed flow chart of FIG. 14 of a subroutine to find a spot of light, which is a step in the main program for coordinate importation through light recognition program of the present invention as shown in FIGS. 4 and 4A;

FIG. 14B is a continuation of detailed flow chart of FIG. 14 and FIG. 14A of a subroutine to find a spot of light, which is a step in the main program for coordinate importation through light recognition program of the present invention as shown in FIGS. 4 and 4A;

FIG. 15 is a detailed flow chart of a subroutine to execute a video I/O board command to acquire a frame, which is a step in the subroutine to find a spot of light as shown in FIGS. 14, 14A and 14B;

FIG. 16 is a detailed flow chart of a subroutine to update coordinates of pixels equal to maximum pixel value, which is a step in the subroutine to find a spot of light as shown in FIGS. 14, 14A, and 14B; and FIG. 17 is a detailed flow chart of a subroutine to clear error, which is a step in the subroutine to execute a video I/O board command to acquire a frame as shown in FIG. 15.

Corresponding reference characters indicate corresponding parts throughout the several views of the drawings.

DETAILED DESCRIPTION OF THE PREFERRED EMBODIMENTS

This invention is directed to a method and associated apparatus for importing two dimensional coordinates of points in space into a computer. Referring now by reference numerals to the drawings, and first to FIG. 1, such points in space must reside within a field of view 1 of a video camera 2, which is suitably connected to a computer 3. This video camera 2 can be of any of variety of commercially available models, a preferred example being a Model 4TN2505 CID camera manufactured by the General Electric Co. located at Liverpool, N.Y. Furthermore, the computer 3 can be of virtually any type. To reduce cost, a preferred type of computer would be a personal computer such as an IBM PC/AT manufactured by IBM (International Business Machines). The field of view 1 must contain the coordinate data desired. The only operator action required to accomplish the input and digitization of the coordinate data is to aim a focussed spot of light 4 at the point 5 whose coordinates are desired and depress a trigger switch 6 mounted proximate to the light source 22. The trigger actuation signals the computer to capture a frame of video information representing the field of view of the camera 1 as shown in FIG. 2, and with appropriate software, identifies the picture element within that frame which has the highest (brightest) value. This picture element will be the one associated with the region 17 within the field of view upon which the spot 5 of light impinged at the time the trigger switch 6 was depressed. The actual digital coordinates of the point thus identified are then calculated based upon the previously established relationship between the video frame and the field of view being imaged. The process can be repeated as often as desired in order to, for example, establish within the computer a list of coordinates (i.e., a database) that represents the vertices of objects residing within the camera field of view. Such a list of coordinates subsequently allows the reconstruction (by the computer) of a digitized representation of the object originally imaged.

A preferred light beam source 22 is a small helium-neon laser pointer. The light beam source 22 is mounted onto a handle 9 that was equipped with a trigger switch 6 as shown in FIG. 1. The trigger switch 6, designated as ENTER, is wired to a digital input 8 on a Data Translation DT2801 Analog and Digital I/O Board 7. This board 7 is manufactured by Data Translation located at Marlborough, Mass. A digital output 10 from the DT2801 I/O board is connected to the light source 22 and used to turn the light source 22 on and off. The coordinates of a point on a substantially flat material 11 or surface are then entered into the computer 3 by pointing the light source 22, e.g., laser, at the desired place on the material 11 and pressing the trigger switch 6. A good example of substantially flat material 11 may be a textile fabric, however, any type of substantially flat material or surface will suffice.

There can be additional switches added as inputs to the Digital I/O Board 7. For the examination of defects in textile fabrics, an abort switch 12 and an end switch 13 are preferred, the function of which will be described hereinafter. The solid-state video camera 2 was connected to a Data Translation DT2803-60 Hz Low-Cost Frame Grabber video board 14. A monochrome video monitor 15 was also connected to the video board 14 and used to view the image output of the video board 14. The Data Translation DT2803-60 Hz Low-Cost Frame Grabber video board 14 is manufactured by Data Translation located at Marlborough, Mass. The monochrome video monitor 15 is manufactured by Hitachi ® located in Japan.

Any preferred electrical components are illustrated as examples only and should not be deemed limiting in any way since a broad spectrum of substitutions are possible. The DT2801 board 7 and the DT2803 board 14 were used to implement the invention only because they were readily available. Virtually any digital I/O board and any frame grabber may be used. In fact, a dedicated parallel digital I/O board would have been easier to use than the DT2801 and would have made the software program somewhat simpler and would therefore be preferred.

A primary aspect of this invention is a software program which uses image processing techniques to locate the coordinates of the spot of light. As a non-limiting example, the coordinates were ultimately used to determine the location of a defect relative to a map of cut parts of a textile fabric. This specific method of entering the coordinates of physical, real world locations into a computer could have other applications, other than entering fabric defect locations into a computer.

FIG. 3 is the basic general process steps required to get coordinates of a light spot into a computer. The first step is to turn on the light source, e.g., laser, as indicated by Block 50. The next step is to create two temporary frame buffers in memory (Block 51). The contents of the frame grabber memory should then be saved in temporary buffer number one (Block 52). The area in the field of view to be searched is then calculated (Block 53). A determination is then made if the trigger switch 6 (FIG. 1) is closed (Block 54). If the trigger switch 6 is closed, then a frame will be acquired (Block 55). The contents of the frame grabber memory should then be saved in temporary buffer number two (Block 56). The light source should then be turned off (Block 57), a frame should be acquired (Block 58) and then the light source turned on (Block 59). The next step would be to subtract image data in frame grabber memory from image data in temporary buffer number two (Block 60) while saving the minimum and maximum x and y coordinates of the brightest pixels (Block 61). If the brightest pixel value is not greater than the threshold value (Block 62) then the x coordinate is set to zero (0) and the y coordinate is set to a no spot found code (Block 64). If the brightest pixel value is greater than the threshold value (Block 62) then a determination of the median x and y coordinates from the minimum and maximum x and y coordinates is made (Block 63). This is shown as the area 17 found in the field of view 1 found in FIG. 2, wherein the median x and y coordinate is the bright spot 5. The next step is to restore the original frame grabber contents from temporary buffer number 1 (Block 65), free the temporary buffers (Block 66) and return the x and y coordinates (Block 67).

FIGS. 4 through 17 are a detailed specific application involving defect detection in fabric utilizing an IBM PC/AT, DT2801 I/O Board, and DT2803 Video Board. This program is for cutting out parts from multiple layers of fabric. This specific application is designed to operate within an operating program for simulating a fabric spreader and is specifically designed to enter coordinates of fabric defects. If a fabric defect (stop mark, hole, grease spot, etc.) is encountered while spreading the fabric, the spreader operator needs to know how the defect is going to affect a part or parts that will later be cut from the stack of fabric on the table. A map of where the parts are located, with reference to the spreader table, can be stored in a computer. If the operator could enter the location of the defect into the computer, then the computer could determine which parts are affected by the defect and tell the operator how to handle that particular defect. The computer also could use the defect location data for later analysis and reporting. Before this invention, the only known ways of entering the location of a defect into a computer were either for the operator to measure the coordinates of the defect with some sort of ruler from a fixed reference point and type them into the computer via a keyboard, or to move a light source mechanically connected to devices that measure the x, y coordinates of the light source until a spot of light is in the desired location and a computer is instructed to read the x, y coordinates of the light source from the measuring devices.

As a matter of background information, the DT2801 I/O Board has a number of specific characteristics and functions. All DT2801 series boards are identical except in the analog to digital (A/D) conversion subsystem. The DT2801 is indicated by numeral 7 in FIG. 1. All DT2801 series boards have two digital to analog (D/A) converters. In addition, the DT2801 series boards have two 8-line digital I/O ports that can be used separately to read or write 8-bit transfers, or the ports can be used simultaneously for a 16-bit transfer. This invention uses only the digital I/O portion of the DT2801 board. The DT2801 board supports a range of commands that perform various functions. The functions are controlled and monitored by writing commands, command parameters, and data to registers on the board; or by reading the board status and data from these registers. The board contains the following 8-bit registers: 1. Command Register (write only); 2. Status Register (read only); 3. Data In Register (write only); and 4. Data Out Register (read only). These registers are I/O mapped. The base address of the board is jumper-selectable to any even address in the IBM Personal Computer (PC) 10-bit I/O address space. The address of the Data In Register and the Data Out Register is the base address. The address of the Command Register and the Status Register is the base address plus one (1).

The Command Register receives command bytes that specify and control the operation of the DT2801 board. The register is divided into two four-bit sections. The lower four bits are interpreted by the DT2801 board as an OPeration CODE. The OPCODE specifies one of sixteen commands that the DT2801 board will perform. The upper four bits are command modifiers. The sixteen commands are: 1. RESET; 2. CLEAR ERROR; 3. READ ERROR REGISTER; 4. SET INTERNAL CLOCK PERIOD; 5. STOP; 6. TEST; 7. SET DIGITAL PORT FOR INPUT; 8. SET DIGITAL PORT FOR OUTPUT; 9. READ DIGITAL INPUT IMMEDIATE; 10. WRITE DIGITAL OUTPUT IMMEDIATE; 11. WRITE D/A IMMEDIATE; 12. SET D/A PARAMETERS; 13. WRITE D/A; 14. READ A/D IMMEDIATE; 15. SET A/D PARAMETERS; and 16. READ A/D.

The Status Register reflects the current status of the DT2801 board. The bits of this register are used as Status flags, and indicate: 1. If an error has occurred; 2. Whether a command has completed; 3. Whether the last byte written to the DT2801 board was written to the Data In Register or to the Command Register; 4. Whether a write to the Data In Register can occur; and 5. Whether a read from the Data Out Register can occur. The Data In Register is a write-only register. It receives data written from the PC to the DT2801 board to perform a D/A conversion, or a digital output operation. The Data In Register also receives command parameters as part of the operating sequences of a number of commands. The Data Out Register is a read-only register. It contains data that is read from the DT2801 board by the PC as a result of an A/D conversion, or a digital input operation. When a READ ERROR REGISTER command is used, the Data Out Register contains information that specifies which error flags have been set.

The basic steps in this program are detailed in FIGS. 4 and 4A. Please keep in mind that these two Figures are part of the same flow chart. The first step is to turn on the light source, e.g., laser (Block 100). This involves another subroutine having two steps located in FIG. 5. The first step is to set port 1 as an output port (Block 101). This one step is accomplished by the subroutine listed in FIG. 11. The first step is to read the status register of the DT2801 digital I/O board (Block 102). A determination is then made as to whether the data-in-full bit in the status register is cleared (Block 103) so that an output command can be sent to the data-in register. If it is not clear, the data-in-full bit will continue to be read in an endless loop until it is cleared. The next step is to again read the status register of the DT2801 digital I/O board (Block 104). A determination is then made as to whether the ready bit in the status register is set (Block 105). If it is not set, the ready bit will continue to be read in an endless loop until it is set, so that an output command can be sent to the data-in register. The third step is to again read the status register of the DT2801 digital I/O board (Block 106). A determination is then made as to whether the composite error bit in the status register is set (Block 107). If it is set, the error will be cleared (Block 109) and the program will loop back to the beginning (Block 102) and check the data-in-full bit and the ready bit again until the composite error bit is no longer set at Block 107. Error clearing is found in the subroutine of FIG. 13. The first step is to output a STOP command to the DT2801 command register (400). The next step is to read the DT2801 data-out register (Block 401) to clear the DATA OUT register and to clear the board to the ready state. The next step is to read the status register of the DT2801 digital I/O board (Block 402). A determination is then made as to whether the data-in-full bit in the status register is cleared (Block 403). If it is not clear, the data-in-full bit will continue to be read in an endless loop until it is cleared. The next step is to again read the status register of the DT2801 digital I/O board (Block 404). A determination is then made as to whether the ready bit in the status register is set (Block 405). When both of the above conditions are met, a command may be sent to the command register. The final command is to output a CLEAR ERROR command to the DT2801 command register (Block 406) that is the end of this subroutine (Block 407). The next step in the subroutine to set port 1 as an output port (FIG. 11) is to send the SET DIGITAL PORT FOR OUTPUT command to the DT2801 command register (Block 108). The next step is to read the DT2801 status register (Block 110) to determine if the data-in-full bit is cleared (Block 111) with looping until clearance as previously described to determine if a write to the data-in register can occur. The next step is to output 01 hexadecimal to the DT2801 data-in register to select port 1 as an output port (Block 112). The next step is to read the DT2801 status register (Block 113) to determine if the data-in-full bit is cleared (Block 114) with looping until clearance as previously described. The final step is to read the DT2801 status register (Block 115) to determine if the ready bit is set (Block 116) with looping until clearance as previously described. This completes the step of setting port one as an output port (Block 101, FIG. 5) and determines if the command is complete. The second and final step in turning on the light source is to output 02 (hexadecimal) to port 1 (Block 120), as shown in FIG. 5. The subroutine that makes up this step is shown in FIG. 12. The first step of the subroutine of FIG. 12 is to read the status register of the DT2801 digital I/O board (Block 121). A determination is then made as to whether the data-in-full bit in the status register is cleared (Block 122). If it is not clear, the data-in-full bit will continue to be read in an endless loop until it is cleared. The next step is to again read the status register of the DT2801 digital I/O board (Block 123). A determination is then made as to whether the ready bit in the status register is set (Block 124). If it is not set, the ready bit will continue to be read in an endless loop until it is set. The third step is to again read the status register of the DT2801 digital I/O board (Block 125). A determination is then made as to whether the composite error bit in the status register is set (Block 126). If it is set, the error will be cleared (Block 127) and the program will loop back to the beginning (Block 121) and check the data-in-full bit and the ready bit again until the composite error bit is no longer set at Block 126. Error clearing is found in FIG. 13. The first step is to output a STOP command to the DT2801 command register (400). The next step is to read the DT2801 data-out register (Block 401) to clear the DATA OUT register and return the board to the ready state. The next step is to read the status register of the DT2801 digital I/O board (Block 402). A determination is then made as to whether the data-in-full bit in the status register is cleared (Block 403). If it is not clear, the data-in-full bit will continue to be read in an endless loop until it is cleared. The next step is to again read the status register of the DT2801 digital I/O board (Block 404). A determination is then made as to whether the ready bit in the status register is set (Block 405). When both of the above conditions are met, a command may be sent to the command register. The final command is to output a CLEAR ERROR command to the DT2801 command register (Block 406) that is the end of this subroutine (Block 407).

The next step in the subroutine, as shown in FIG. 11, is to send the WRITE DIGITAL OUTPUT IMMEDIATE command to the DT2801 command register (Block 128). The next step is to read the DT2801 status register (Block 129) to determine if the data-in-full bit is cleared (Block 130) with looping until clearance as previously described in order to determine if an output can be made to the data-in register. The next step is to output 01 hexadecimal to DT2801 data-in register to select port 1 as an output port (Block 131). The next step is to read the DT2801 status register (Block 132) to determine if the data-in-full bit is cleared (Block 133) with looping until clearance as previously described so that an output may be made to the data-in register. The next step is to output the desired data (02 hexadecimal) for port 1 to the DT2801 Data-In Register (Block 134). The next step is to again read the DT2801 status register (Block 135) to determine if the data-in-full bit is cleared (Block 136) with looping until clearance as previously described. The final step is to read the DT2801 status register (Block 137) to determine if the ready bit is set (Block 138) with looping until clearance as previously described until the ready bit is set (Block 139), which is the final step in the subroutine. These first two steps will determine if the command has been and is thereby complete. This completes the step of turning on the light source (Block 100, FIG. 4), thereby completing the subroutine of FIG. 5.

The next step in the main program of FIG. 4 is to create two temporary frame buffers in memory (Block 140). This is accomplished by the subroutine detailed by the flow chart located in FIG. 6. The first step is to call the operating system, e.g., DOS, to allocate a sixty (60) kilobyte Block of memory (Block 141) to create temporary buffer number one. If the allocation is not successful (Block 142), then an error handling program is called (Block 143) and then a jump to the exit routine (Block 144), both of which are routines generated by a calling program to deal with error handling, reception of digital inputs and message routines. The calling program simulates the operation of a fabric spreader. If the allocation of memory is successful (Block 142), then the next step is to call the operating system to allocate another sixty (60) kilobyte Block of memory to create temporary buffer number two. If the allocation is not successful (Block 146), then an error handling program is called (Block 147) and then a jump to the exit routine (Block 148). These are the routines generated by the calling program to deal with error handling, reception of digital inputs and message routines, as previously described. If the allocation of memory is successful (Block 146) then this subroutine is over (Block 149) and the computer will then return to the main program.

The next step in the program of FIG. 4 is to copy the contents of a frame grabber memory found in the video board 14 (FIG. 1) into the temporary 60 kilobyte buffer 1 (Block 150), which was just previously generated. The DT2803-60 Hz Low-Cost Frame Grabber 14 is a microprocessor based video imaging interface, designed for IBM Personal Computers and IBM-compatible personal computers (PCs). This subsystem performs: 1. Real-time 6-bit digitization of an RS-170/RS-330/NTSC-compatible monochrome input signal; 2. Display of monochrome imaging frames in up to 64 intensities; or 3. Display of up to 256 different attributes from a palette of 64 colors by 64 intensities, in as little as 1/30th of a second. The DT2803 consists of four major functional parts: 1. Video Imaging input analog to digital (A/D) converter and look-up tables (LUTs); 2. 64 kilobyte frame-store memory; 3. Video Imaging output digital to analog (D/A) converter and look-up tables (LUTs); and 4. Microprocessor and control logic. The frame-store memory is mapped into the PC memory area where it can be accessed at any time over the PC bus using normal memory instructions. The first pixel of the first line is at the Memory Base Address. The DT2803-60 Hz stores images as 240 lines with 256 pixels per line. The frame-store memory can be jumper-selected to occupy any one of sixteen Blocks of 64 kilobyte memory within the PC's one megabyte memory. The DT2803 is controlled by a resident microprocessor, which acts as an I/O interface to the PC bus. All I/O operations are directly controlled by the microprocessor under the direction of internal firmware. Communication with the DT2803 board occurs through two consecutive 8-bit I/O locations, which access the following 8-bit hardware registers: 1. Data In Register (write only); 2. Data Out Register (read only); 3. Command Register (write only); and 4. Status Register (read only). These registers are I/O mapped. The base address is selected with four on-board jumpers. The address of the Data In Register and the Data Out Register is the base address. The address of the Command Register and the Status Register is the base address plus one (1).

The DT2803 is controlled by writing command bytes to the Command Register, and by writing data bytes to the board's Data In Register. The operations of the DT2803 are handled by specific command sequences; many of these are associated with internal registers located within the microprocessor subsystem. These registers cannot be accessed directly, but can be manipulated using the command sequences. The internal registers consist of the following: 1. ERROR Register (read only); 2. ACTIVITY Register (read only); 3. INTERRUPT MASK Register (read/write); 4. WRITE PROTECT MASK Register (read/write); 5. CURSOR LINE Register (read/write); and 6. CURSOR PIXEL Register (read/write). Each of the six internal registers has sixteen bits.

The eight bits of the command byte, which is written to the Command Register, form an OPeration CODE (OPCODE). The commands that can be performed by the DT2803 are: 1. STOP; 2. RESET; 3. TEST; 4. READ CONFIGURATION; 5. READ ERROR REGISTER; 6. READ ACTIVITY REGISTER; 7. SET SOFTWARE ERROR; 8. CLEAR ERROR; 9. READ INTERRUPT MASK; 10. WRITE INTERRUPT MASK; 11. ENABLE INTERRUPTS; 12. DISABLE INTERRUPTS; 13. READ PROTECTION MASK; 14. WRITE PROTECTION MASK; 15. ENABLE WRITE PROTECT; 16. DISABLE WRITE PROTECT; 17. UNDEFINED; 18. UNDEFINED; 19. SET INTERNAL TIMING; and 20. SET EXTERNAL TIMING.

The are also five imaging commands as follows: 1. SELECT INPUT LOOK-UP TABLE; 2. ACQUIRE FRAME; 3. PASS-THROUGH; 4. ACQUIRE FRAME FROM PORT; and 5. SEND FRAME TO PORT AND ACQUIRE FRAME FROM PORT. There are fourteen imaging output commands as follows: 1. READ CURSOR POSITION; 2. WRITE CURSOR POSITION; 3. CURSOR ON; 4. CURSOR OFF; 5. READ OUTPUT LOOK-UP TABLE; 6. WRITE OUTPUT LOOK-UP TABLE; 7. READ OUTPUT LOOK-UP TABLE ENTRY; 8. WRITE OUTPUT LOOK-UP TABLE ENTRY; 9. SELECT OUTPUT LOOK-UP TABLE; 10. DISPLAY LOOK-UP TABLE ENTRY; 11. DISPLAY ATTRIBUTE; 12. DISPLAY ON; 13. DISPLAY OFF; and 14. SEND FRAME TO PORT.

The Status Register reflects the current status of the DT2803 board. The bits of this register are used as Status flags, and indicate: 1. If an error has occurred; 2. Whether a command has completed; 3. Whether the last byte written to the DT2801 board was written to the Data In Register or to the Command Register; 4. Whether a write to the Data In Register or the Command Register can occur; and 5. Whether a read from the Data Out Register can occur.

The Data In Register and the Data Out Register are two 8-bit data registers which are used to transfer data between the DT2803 and the host PC. The Data In Register is used to transfer data from the host PC to the DT2803; the Data Out Register is used to transfer data from the DT2803 to the host PC. This is done by writing information or command parameters to the Data In Register, and by reading the data from the Data Out Register, as required by the command sequence.

Returning now to the main program of FIG. 4, the next step is to calculate the width of the area to be searched (Block 160). This involves the step of subtracting the seam allowance times two from the fabric width (Block 161) and saving the result as a value designated as line length (Block 162) as shown as a separate subroutine in FIG. 7.

The next step in the main program of FIG. 4 is to send a prompt message to the operator either to enter, end, or abort (Block 170). This is done by the previously described calling program and actually prints the request on the monitor 15, as shown in FIG. 1. After displaying the message on the screen of the monitor to prompt the operator to press either the ENTER 6, the END 13, or the ABORT 12 switch, as shown in FIG. 1, the various switches, that are used by the operator to simulate the running of a fabric spreader and to trigger the process of entering the coordinates of a spot of light into the computer, are read using the "read digital input immediate" command. The program then repeatedly reads the digital inputs of the I/O board until one of the three switches is activated (Block 171). If the abort switch is activated (Block 172), the program sets the x coordinate to 0 and the y coordinate to 255 (Block 176), turns off the light source by outputting a 00 hexadecimal to port 1 (Block 181) and (Block 182, FIG. 8), sends an audio signal to the standard output (Block 290), copies the contents of temporary buffer number 1 to frame storage memory (Block 291) and frees the memory used by the temporary buffers one and two (Block 292). This step of freeing the memory of the temporary buffers (Block 292) is further detailed by the subroutine found in FIG. 10. First, the operating system is called to free the memory used by temporary buffer number two (Block 300) and a determination is made as to whether the memory is freed (Block 301). If the memory is not freed, then the error handler (Block 302) and jump exit (Block 303) routines of the calling program are utilized. If the memory is freed (Block 301) then the operating system is again called to free the memory used by temporary buffer number one (Block 304) and a determination is made as to whether the memory is freed (Block 305). If the memory is not freed, then, the error handler (Block 306) and the jump exit (Block 307) routines of the calling program are utilized. If the memory is freed (Block 305), then the subroutine of FIG. 10 is over (Block 308). The x and y coordinates are then saved (Block 293) and the computer returns to the previously described calling program (Block 294) as shown in FIG. 4A.

If the end switch is activated (Block 173), the program sets the x coordinate to 0 and the y coordinate to 254 (Block 175), turns off the light source by outputting a 00 hexadecimal to port 1 (Block 182, FIG. 8), sends an audio signal to the standard output (Block 290), copies the contents of temporary buffer number one to frame storage memory (Block 291) and frees the memory used by the temporary buffers (Block 292). This step of freeing the memory of the temporary buffers (Block 292) is further detailed by the subroutine found in FIG. 10. First, the operating system is called to free the memory used by temporary buffer number two (Block 300) and then a determination is made as to whether the memory is freed (Block 301). If the memory is not freed, then the error handler (Block 302) and jump exit (Block 303) routines of the calling program are utilized. If the memory is freed (Block 301) then the operating system is again called to free the memory used by temporary buffer number one (Block 304) and then a determination is made as to whether the memory is freed (Block 305). If the memory is not freed, then the error handler (Block 306) and the jump exit (Block 307) routines of the calling program are utilized. If the memory is freed (Block 305), then the subroutine of FIG. 10 is over (Block 308). The x and y coordinates are then saved (Block 293) and the computer returns to the previously described calling program (Block 294) as shown in FIG. 4A.

If the ENTER switch is not activated (Block 174), then the program will loop to Block 171 in an effort to constantly check the three input switches. The ENTER switch is the trigger switch 6 mounted on a handle 9 proximate to the light source 22 as shown in FIG. 1. If the ENTER switch is activated (Block 174), the program then calculates the left edge of the area to be searched (Block 190). The subroutine for calculating the left edge of the area to be searched is detailed by FIG. 9. This involves adding the pixel value of the left edge of the spreading table to the distance in pixels from the left edge of the spreading table to the left edge of the marker (Block 191). The resulting Value is then saved as a variable designated as line start (Block 192).

The next step in the main program of FIG. 4A, is to find the spot of light, e.g., laser (Block 260). This is accomplished by the subroutine located in FIGS. 14, 14A and 14B. Please keep in mind that these three Figures are part of the same flow chart. The first step is to execute DT2803 command of ACQUIRE FRAME (Block 201). This step (Block 201) is broken down into further detail by the subroutine found in FIG. 15, wherein the first step is to read the status register of the DT2803 video board (Block 500). A determination is then made as to whether the data-in-full bit in the status register is cleared (Block 501). If it is not clear, the data-in-full bit will continue to be read in an endless loop until it is cleared. The next step is to again read the status register of the DT2803 video board (Block 502). A determination is then made as to whether the ready bit in the status register is set (Block 503). If it is not set, the ready bit will continue to be read in an endless loop until it is cleared. The third step is to again read the status register of the DT2803 video board (Block 504). A determination is then made as to whether the composite error bit in the status register is set (Block 505). If it is set, the error will be cleared (Block 506) and the program will loop back to the beginning (Block 500) and check the data-in-full bit and the ready bit again until the composite error bit is no longer set at Block 505. Error clearing is found in the subroutine of FIG. 17. The first step is to output a STOP command to DT2803 command register (600). This is followed by a reading of the DT2803 data out register (Block 601) in order clear the DATA OUT register and return the board to the ready state. The next step is to read the status register of the DT2803 video board (Block 602). A determination is then made as to whether the data-in-full bit in the status register is cleared (Block 603). If it is not clear, the data-in-full bit will continue to be read in an endless loop until it is cleared. The next step is to again read the status register of the DT2803 video board (Block 604). A determination is then made as to whether the ready bit in the status register is set (Block 605). This will loop until the ready bit in the status register is set. The above steps in FIG. 17 are merely preparatory steps for the issuance of a command to the command register. The final command is to output a clear error command to the DT2803 command register (Block 606) that is the end (Block 607) of this subroutine. Returning to FIG. 15, once the error clear indication is not set, then the next step is to output an ACQUIRE FRAME command to the DT2803 command register (Block 507). The preceding steps in FIG. 15 were merely preparatory steps for outputting this command. The next step is to read the DT2803 status register (Block 508) to determine if the data-in-full bit is cleared (Block 509) with looping until clearance as previously described. The final step is to read the DT2803 status register (Block 510) to determine if the ready bit is set (Block 511) with looping until clearance as previously described. If the ready bit is set (Block 512), then the program returns to the subroutine of FIG. 14. These last two steps determine if the command has been sent.

The next step in the program of FIG. 14, is to save the contents of the frame-store memory in temporary buffer number two (Block 202) and turn off the light source (Block 203) by outputting 00 hexadecimal to port 1 (Block 190, FIG. 8). The next step is to execute a DT2803 command to ACQUIRE FRAME (Block 204) as shown in FIGS. 15 and 17 as described above. The next step is to turn on the light source by the subroutine of FIG. 5, as previously described. This is followed by clearing the temporary maximum pixel value (Block 206) and setting the line counter to a value of 240 (Block 207). As previously recited, there are 240 horizontal lines in the field of view. The next step is to set the segment of frame-store pointer (Block 208). The next step is to set the offset of this pointer equal to the line start value (Block 209), previously described in Block 192 of FIG. 9. This will result in the pointer being directed at the first pixel out of 256 in a row that is in the first row out of 240 for the first iteration. The pointer for temporary buffer number two that corresponds to the frame store memory also will be offset by the value of the line start value (Block 209). The next step is to set segment of temporary buffer number two pointer (Block 210). This establishes the one-to-one correspondence between pixels in the frame store memory and temporary buffer number two.

The next step is to set a pixels/line counter equal to the value of the line length (Block 211), which was previously developed by the subroutine of FIG. 7 (Block 162). Then, subtract the numerical brightness attribute for the pixel in frame storage memory from the numerical brightness attribute for the pixel in temporary buffer number two (Block 212) and if the result is less than zero (0) (Block 213), then set the result to zero (0) (Block 901). The result is then stored in frame store memory at location of the subtrahend (Block 214). The maximum value of the numerical attributes relating to brightness is 63 for this Video Board. Referring now to FIG. 14A, if the result is neither less than the temporary maximum pixel value (Block 215) or equal to the temporary maximum pixel value (Block 216), then the result is saved as the new temporary maximum pixel value (Block 217). The coordinates of the pixel are saved in the following variables: laser_xmin, laser_xmax, laser_ymin, laser_ymax. If the result is equal to the temporary maximum pixel value (Block 216) then the coordinates of that pixel are used to adjust the values of the minimum and maximum coordinates of pixels with brightnessess equal to the temporary maximum pixel value (Block 219). This step is further divided into the subroutine of FIG. 16. The first step is to determine if the x coordinate of the pixel is less than the value of the variable laser_xmin (Block 513). If the answer is yes, then save the x coordinate of the pixel in the variable laser_xmin (Block 514), and if the answer is no, then determine if value of the variable laser_xmax less than the value of the x coordinate of the pixel (Block 515). If the value of the variable laser_xmax value is less than value of the x coordinate of the pixel, then save the value of the x coordinate of the pixel in the variable laser_xmax (Block 516). Do not save the value of the x coordinate of the pixel in variable laser_xmax if the value of the variable laser_xmax value is greater than or equal to the value of the x coordinate of the pixel. The next step is to determine is to determine if the value of the y coordinate of the pixel is less than value of the variable laser_ymin (Block 517). If the answer is yes, then the value of the y coordinate of the pixel is saved in variable laser_ymin (Block 519), and if the answer is no, then determine if value of the variable laser_ymax less than y coordinate of the pixel (Block 518). If the laser_ymax value is less than the value of the y coordinate of the pixel (Block 518), then save the value of the y coordinate of the pixel in variable laser_ymax (Block 520), otherwise, do not save the value of the y coordinate of the pixel in variable laser_ymax which is the final step in this subroutine (Block 521).

Then, regardless of whether the result is greater than, less than or equal to the temporary pixel value, the next step for all conditions is to increment the frame-store pointer to the next pixel to be processed on that line (Block 220) as shown in FIG. 14A (the temporary buffer number two pointer is automatically incremented in Block 212). The pixels/line counter will then need to be decremented (Block 221). If the pixels/line counter is greater than zero (0) (Block 222), then Blocks 212 through 221 are repeated for the next pixel in sequence on that line. Please keep in mind that there is a one-to-one correspondence between the pixel in the frame store memory and the pixel in temporary buffer number two with the numerical brightness attribute of the pixel in the frame store memory being subtracted from numerical brightness attribute of the pixel in the temporary buffer number two. If the pixels/line counter is less than or equal to zero (0) (Block 222), then the number 256 is added to the line start value (Block 223) and the value of the line counter is decremented by one (Block 224). As previously mentioned, the number 256 is the maximum number of pixels on any line within a field of view, therefore, adding 256 to the line start value moves the offset of the pointers causing them to point to the first pixel of the next line to be processed when Blocks 209 and 210 are executed. If the line counter is greater than zero (Block 225) then repeat Blocks 209 through 224 in FIG. 14 and FIG. 14A so that all necessary pixels on every line for all lines are computed in this subtraction process. If the line counter is less or equal to zero (Block 225) then the value of the temporary maximum pixel is checked to see if the numerical brightness attribute is greater than five (Block 226). The brightness value of five is arbitrary and was determined empirically. If the temporary maximum pixel brightness attribute value is less than or equal to five, then the value of the y coordinate is set to 255 (Block 228) and this portion of the program is over (Block 229) and the program will return to Block 270 of FIG. 4A as previously described. If the temporary maximum pixel value is greater than five, then the next step is to subtract the value of the variable laser_xmin from the value of the variable laser_xmax, and divide the result by two (2) and add the result to the variable laser_xmin (Block 230). The value of the x coordinate is then set to the value of the variable laser_xmin (Block 231). The next step is to subtract value of the variable laser_ymin from the value of the variable laser_ymax, and divide the result by two (2) and add the result to the variable laser_ymin (Block 232). The value of the y coordinate is then set to the value of the variable laser_ymin (Block 233). This sequence (Blocks 230 through 233) is to determine median coordinates to pinpoint the center of the rectangular region 17 as shown in FIG. 2.

The program has now found the spot of light and returns (Block 234) to the main program of FIG. 4A (Block 260). A determination is then made if the y coordinate is equal to 255 (Block 270). If the y coordinate equals 255 then an error message is sent to the operator via the monitor such as: "Unable to locate spot" (Block 280), which is accomplished by means of the previously described calling program. If the y coordinate is less than 255 (Block 280), then an audio signal is sent to standard output (Block 290) and the contents of temporary buffer number one are sent to frame-store memory (Block 291). The next step is to free the memory used by the temporary buffers (Block 292). This step is further detailed by the subroutine found in FIG. 10. The first step is to call the operating system to free the memory used by temporary buffer number two (Block 300), then if the memory is not freed (Block 301), then the error handler (Block 302) and jump exit (Block 303) routines of the calling program are utilized. If the memory is freed (Block 301), then the operating system is called to free the memory used by temporary buffer number one (Block 304), then if the memory is not freed (Block 305), then the error handler (Block 305) and jump exit (Block 307) routines of the calling program are utilized. If the memory is freed (Block 305), then the subroutine of FIG. 10 is over (Block 308). Returning now to the main program of FIG. 4A, the next step is to save the x and y coordinates for return to the calling program (Block 293), and then to actually return to the calling program (Block 294).

In summary, this invention begins by turning on the laser or other light source. Then, two 60 kilobyte buffers are created in a computer's memory. The current contents of a video board's frame-store memory are saved in the first buffer. The program then calculates the width of the area, in the field of view of a video camera, that is to be searched to find the spot of light from the laser. A message is then placed on the screen of the monitor to prompt the operator to press either the ENTER, the END, or the ABORT switch. The program then repeatedly reads the digital inputs of the I/O board until one of the three switches are activated. When the ABORT switch is activated, the program returns the x, y coordinates of 0, 255 to the calling program to signal that the entry of coordinate data was canceled. When the END switch is activated, the program returns the x, y coordinates of 0, 254 to the calling program to signal that the entry of coordinate data was finished, and when the ENTER switch is activated, the program calculates the location of the left edge of the area to be searched and then utilizes a routine that either finds the coordinates of the laser spot and returns them to the calling program, or it reports to the operator that it cannot find the laser spot and repeats the above process until the laser spot is found.

The routine that searches for the laser spot commands the video board to acquire a frame. The routine then saves the contents of the frame-store memory in the second buffer that was previously created. The routine then turns the laser off, commands the video board to acquire a frame, and then turns the laser on. The routine then subtracts the data of interest from the second frame, which was in the video board's frame-store memory, from the data of interest from the first frame, which was in the second buffer, and stores the result in the video board's frame-store memory. The data of interest is the data that is in the area to be searched, as determined by the left edge and the width of the search area. The brightest pixels are those found during the subtraction of the two frames and are assumed to be the laser spot. The minimum and maximum X and Y coordinates of the brightest pixels are found and saved during the subtraction of the two frames. If the brightest pixel value was greater than a threshold, (5, out of a maximum of 63 is the threshold, however, any numerical brightness values or associated thresholds will suffice). The median point of the brightest pixels is then determined and returned to the program as the coordinates of the laser spot. If there were no pixels that had a value greater than the threshold value, then the routine returned a Y value of 255 to the program to signal it that a spot was not found. Since there are only 240 lines in a frame, 255 is used to indicate an invalid coordinate. When the program returns to the calling program, the program restores the contents of the DT2803's frame-store memory by copying the data from the first buffer into the frame-store memory. The memory used by the two 60 kilobyte buffers are also freed up. This program uses coordinate data to mark the outline of a flaw or other two dimensional object to be outlined and determines location relative to a map of parts or subsections.

It is not intended that the scope of the invention be limited to the specific embodiment illustrated and described. Rather, it is intended that the scope of the invention be defined by the appended claims and their equivalents.

What is claimed is:

1. A system for measuring x and y coordinates of a surface comprising:
    (a) a means for assigning numerical brightness attributes for at least one pixel in a field of view of a video camera;
    (b) a memory for storing a plurality of sets of said numerical brightness attributes for said at least one pixel in said field of view of said video camera, one of said sets obtained with a light source present in said field of view, and the other of said sets obtained without said light source present in said field of view;
    (c) a means for comparing said plurality of sets of said numerical brightness attributes for said at least one pixel in said field of view of said video camera, one of said sets obtained with a light source present in said field of view, and the other of said sets obtained without said light source present in said field of view, to form a difference in said numerical brightness attributes with a one-to-one correspondence of said at least one pixel in each of said sets; and
    (d) a means for determining minimum and maximum x and y coordinate values of pixels having the highest value of said difference in numerical brightness attributes to determine the location of said at least one pixel, further comprising a means for calculating a search area in said field of view to be utilized by said means for comparing.

2. A system for measuring x and y coordinates of a surface as defined in claim 1, wherein said means for comparing performs a subtraction of numerical brightness attributes of at least one pixel in a field of view without said light source from numerical brightness attributes of a corresponding pixel in said field of view with said light source.

3. A system for measuring x and y coordinates of a surface as defined in claim 1, further comprising a means for determining if said difference in said numerical brightness attributes for said minimum and maximum x and y coordinate values of pixels is greater than a threshold value.

4. A process for measuring x and y coordinates of a surface comprising the steps of:
    (a) assigning numerical brightness attributes for at least one pixel in a field of view of a video camera;
    (b) storing a plurality of sets of said numerical brightness attributes for said at least one pixel in said field of view of said video camera, one of said sets obtained with a light source present in said field of view, and the other of said sets obtained without said light source present in said field of view;
    (c) comparing said plurality of sets of said numerical brightness attributes for said at least one pixel in said field of view of said video camera, one of said sets obtained with a light source present in said field of view, and the other of said sets obtained without said light source present in said field of view, to form a difference in said numerical brightness attributes with a one-to-one correspondence of said at least one pixel in each of said sets; and (d) determining minimum and maximum x and y coordinate values of pixels having the highest value of said difference in numerical brightness attributes to determine the location of said at least one pixel, further comprising the step of calculating a search area in said field of view to be utilized by said step of comparing.

5. A process for measuring x and y coordinates of a surface as defined in claim 4, wherein the step of comparing includes subtracting numerical brightness attributes of at least one pixel in a field of view without said light source from numerical brightness attributes of a corresponding pixel in said field of view with said light source.

6. A process for measuring x and y coordinates of a surface as defined in claim 4, further comprising a step of determining if said difference in said numerical brightness attributes for said minimum and maximum x and y coordinate values of pixels is greater than a threshold value.

7. A system for measuring x and y coordinates of a defect in a textile fabric comprising:

(a) a means for assigning numerical brightness attributes for at least one pixel in a field of view of a video camera;

(b) a memory for storing a plurality of sets of said numerical brightness attributes for said at least one pixel in said field of view of said video camera, one of said sets obtained with a light source present in said field of view, and the other of said sets obtained without said light source present in said field of view;

(c) a means for calculating an area of fabric to be searched and for determining a left edge of said area of fabric to be searched;

(d) a means for comparing said plurality of sets of said numerical brightness attributes for said at least one pixel in said area of fabric to be searched, one of said sets obtained with said light source present in said area of fabric to be searched and the other of said sets obtained without said light source present in said area of fabric to be searched to form a difference in said numerical brightness attributes with a one-to-one correspondence of said at least one pixel in each of said sets; and (e) a means for determining minimum and maximum x and y coordinate values of pixels having the highest value of said difference in numerical brightness attributes to determine a location of a defect in said fabric.

8. A system for measuring x and y coordinates of a defect in a textile fabric as defined in claim 7, further comprising a means for determining the median x and y coordinates of said defect in said fabric from said minimum and maximum x and y coordinates.

9. A system for measuring x and y coordinates of a defect in a textile fabric as defined in claim 7, wherein said means for comparing performs a subtraction of numerical brightness attributes of at least one pixel in said area of fabric to be searched without said light source from a corresponding pixel in said area of fabric to be searched with said light source.

10. A system for measuring x and y coordinates of a defect in a textile fabric as defined in claim 7, further comprising a means for determining if said difference in said numerical brightness attributes for said minimum and maximum x and y coordinate values of pixels is greater than a threshold value for said defect in said fabric.

11. A system for measuring x and y coordinates of a defect in a textile fabric comprising:

(a) a means for assigning numerical brightness attributes for a plurality of pixels in a field of view of a video camera;

(b) a memory for storing a plurality of sets of said numerical brightness attributes for said plurality of pixels in said field of view of said video camera, one of said sets obtained with a light source present in said field of view, and the other of said sets obtained without said light source present in said field of view;

(c) a means for calculating an area of fabric to be searched and for determining a left edge of the area of fabric to be searched;

(d) a means for comparing said plurality of sets of said numerical brightness attributes for said plurality of pixels in said area of fabric to be searched one of said sets obtained with a light source present in said area of fabric to be searched and the other of said sets obtained without a light source present in said area of fabric to be searched, to form a difference in said numerical brightness attributes with a one-to-one correspondence of said plurality of pixels in each of said sets; and (e) a means for determining minimum and maximum x and y coordinate values of pixels having the highest value of said difference in numerical brightness attributes to determine a location of a defect in said fabric.

12. A process for measuring x and y coordinates of a defect in a textile fabric comprising the steps of:

(a) assigning numerical brightness attributes for at least one pixel in a field of view of a video camera;

(b) storing a plurality of sets of said numerical brightness attributes for said at least one pixel in said field of view of said video camera, one of said sets obtained with a light source present in said field of view, and the other of said sets obtained without said light source present in said field of view;

(c) calculating an area of fabric to be searched;

(d) determining a left edge of the area of fabric to be searched;

(e) comparing said plurality of sets of said numerical brightness attributes for said at least one pixel in said area of fabric to be searched, one of said sets obtained with a light source present in said area of fabric to be searched and the other of said sets obtained without a light source present in said area of fabric to be searched to form a difference in said numerical brightness attributes with a one-to-one correspondence at least one pixel in each of said sets; and (f) determining minimum and maximum x and y coordinate values of pixels having the highest value of said difference in numerical brightness attributes to determine a location of a defect in said fabric.

13. A process for measuring x and y coordinates of a defect in a textile fabric as defined in claim 12, further comprising the step of determining the median x and y coordinates of said defect in said fabric from said minimum and maximum x and y coordinates.

14. A process for measuring x and y coordinates of a defect in a textile fabric as defined in claim 12, wherein the step of comparing includes a step of subtracting numerical brightness attributes of at least one pixel in said area of fabric to be searched without said light source from numerical brightness attributes of a corresponding pixel in said area of fabric to be searched with said light source.

15. A process for measuring x and y coordinates of a defect in a textile fabric as defined in claim 12, further comprising a step of determining if said difference in said numerical brightness attributes for said minimum and maximum x and y coordinate values of pixels is greater than a threshold value for said defect in said fabric.

16. A process for measuring x and y coordinates of a defect in a textile fabric comprising the steps of:
(a) assigning numerical brightness attributes for a plurality of pixels in a field of view of a video camera;
(b) storing a plurality of sets of said numerical brightness attributes for said plurality of pixels in said field of view of a video camera, one of said sets obtained with a light source present in said field of view, and the other of said sets obtained without said light source present in said field of view;
(c) calculating an area of fabric to be searched;
(d) determining a left edge of the area of fabric to be searched;
(e) comparing said plurality of sets of said numerical brightness attributes for said plurality of pixels in said area of fabric to be searched, one of said sets obtained with a light source present in said area of fabric to be searched, and the other of said sets obtained without a light source present in said area of fabric to be searched to form a difference in said numerical brightness attributes with a one-to-one correspondence of said pixels in each of said sets; and
(f) determining minimum and maximum x and y coordinate values of pixels having the highest value of said difference in numerical brightness attributes to determine a location of a defect in said fabric.

* * * * *